(12) United States Patent
Kaneko

(10) Patent No.: US 7,327,421 B2
(45) Date of Patent: Feb. 5, 2008

(54) LIQUID CRYSTAL DISPLAY DEVICE

(75) Inventor: Yasushi Kaneko, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 512 days.

(21) Appl. No.: 11/060,734

(22) Filed: Feb. 18, 2005

(65) Prior Publication Data

US 2005/0213003 A1   Sep. 29, 2005

(30) Foreign Application Priority Data

Feb. 19, 2004   (JP) .............................. 2004-042873

(51) Int. Cl.
  *G02F 1/1335*   (2006.01)
(52) U.S. Cl. ...................... 349/114; 349/119
(58) Field of Classification Search ................ 349/114, 349/117, 96, 119
  See application file for complete search history.

(56) References Cited

U.S. PATENT DOCUMENTS 6,862,065 B2 *   3/2005   Liao et al. .................. 349/134
2004/0105059 A1 *   6/2004   Ohyama et al. ............. 349/114
2006/0187388 A1 *   8/2006   Ohyama et al. ............. 349/114
2007/0115411 A1 *   5/2007   Ozawa et al. ................ 349/114

FOREIGN PATENT DOCUMENTS

| JP | A-2003-172925 | 6/2003 |
| JP | A-2003-279956 | 10/2003 |
| JP | A-2003-279957 | 10/2003 |

* cited by examiner

*Primary Examiner*—Toan Ton
(74) *Attorney, Agent, or Firm*—Finnegan, Henderson, Farabow, Garrett & Dunner, L.L.P.

(57) ABSTRACT

A liquid crystal display device according to the present invention comprises a first polarizer (1), a second polarizer (17), a liquid crystal cell (20) having a liquid crystal layer (6) provided between a first substrate (1) and a second substrate (2), a transflective layer (7) having openings, a patterning phase retardation layer (9) having retardation in portions other than the portions where the openings of the transflective layer are formed, and an optical element (12) for compensating for an optical property of the liquid crystal layer. The display device thus constructed achieves a high-contrast bright transmissive display, and can also produce a reflective display utilizing an internal reflector type structure.

13 Claims, 10 Drawing Sheets

LIQUID CRYSTAL DISPLAY DEVICE

The applicant claims the right to priority based on Japanese Patent Application No. 2004-042873, filed on Feb. 19, 2004.

TECHNICAL FIELD

The present invention relates to the structure of a liquid crystal display device and, more particularly, to a technique for enhancing the display contrast of a transflective liquid crystal display device, of an internal reflector type, in which a reflective layer is provided within a liquid crystal device.

BACKGROUND ART

A reflective liquid crystal display device comprises a pair of polarizers, a reflective layer disposed on the external side of one of the polarizers, and a TN (twisted nematic) liquid crystal device or an STN (super-twisted nematic) liquid crystal device sandwiched between the pair of polarizers. However, this type of reflective liquid crystal display device has the problem that not only display brightness is low, because the reflective layer is located outside the glass substrate, shadows appear in the display due to parallax. This type of reflective liquid crystal display is called the external-reflector-type reflective display with the reflective layer provided below the bottom substrate when viewed from the top, i.e., the viewer side of the display. Here, a description will be given of how shadows appear in the display. In a liquid crystal display device having such an external reflector type structure, light incident from an obliquely upward direction is reflected by the reflective layer, and exits the liquid crystal display device in an obliquely upward direction. Such obliquely incident light emerges from the liquid crystal display device at a position different from the position where the light entered. This positional difference increases as the distance between the light incidence surface and the reflection surface in the liquid crystal display device increases. On the other hand, electrodes formed on the bottom substrate of the liquid crystal display device have a certain degree of reflectivity, and the obliquely incident light reflected by the electrodes and the obliquely incident light reflected by the reflector disposed behind the substrate are observed as being displaced in position; this displacement shows up as a shadow.

In view of this, there is proposed a reflective liquid crystal display device of an internal reflector type in which a reflective layer is formed within a liquid crystal device and which can produce a display by using a single polarizer. This reflective liquid crystal display device of an internal reflector type, which uses only one polarizer, can achieve higher brightness than the conventional reflective liquid crystal display device that uses two polarizers.

Further, by forming the reflective layer within the liquid crystal device, it also becomes possible to solve the problem of display shadows occurring due to the thickness of the glass substrate. That is, in the internal reflective display device with the reflective layer provided above the bottom substrate, as the reflective layer is located near or in the same position as the electrodes, the above-described displacement is virtually eliminated, and a shadow, if any, is negligibly small.

For the reflective layer, a transflective layer, that is produced by a thin aluminum film formed extremely thin with a thickness of 0.01 µm to 0.03 µm by evaporation or sputtering, can be used. There has also been developed a transflective liquid crystal display device of internal reflector type which uses, as the reflective layer, a transflective layer having openings formed therein, one for each pixel, by photo etching, and which produces a display by using backlighting when the ambient light is low as in the nighttime.

FIG. 15 shows a cross-sectional view of one example of a transflective liquid crystal display device (refer to JP-A-2003-172925).

In the transflective liquid crystal display device shown in FIG. 15, a scattering layer 15, a liquid crystal polymer phase retardation plate 12, and a first polarizer 11 are provided above a liquid crystal device 30, and a quarter-wave length phase retardation plate 14, a second polarizer 17, and a backlight 16 are provided below the liquid crystal device 30.

The liquid crystal device 30 comprises: a first substrate 1 made of a 0.5-mm thick glass plate on which are formed a 0.15-µm thick transflective layer 7 made of aluminum, a 2-µm thick protective layer 8 made of an acrylic-based material, and 0.2-µm thick first electrodes 3 as transparent electrodes made of ITO; a second substrate 2 made of a 0.5-mm thick glass plate on which 0.2-µm thick second electrodes 4 made of ITO are formed; a seal member 5 for bonding the first and second substrates 1 and 2 together; and a liquid crystal layer 6 formed from a left-handed 240° twisted nematic liquid crystal sandwiched between the first and second substrates 1 and 2.

The liquid crystal polymer phase retardation plate 12 has a right-handed twist, the twist angle being 180°, and the $\Delta$nd value, i.e., the product of the birefringence difference $\Delta$n of the liquid crystal polymer and the thickness d of the liquid crystal polymer layer, is 0.73 µm. The retardation value of the quarter-wave length phase retardation plate 14 is 0.14 µm. This retardation value corresponds to about quarter of the green light wavelength of 0.55 µm. The birefringence difference $\Delta$n of the nematic liquid crystal is 0.15, and the cell gap d between the first substrate 1 and the second substrate 2 is 5.6 µm; therefore, the $\Delta$nd value that represents the birefringence of the liquid crystal device 30 is 0.84 µm (=0.15×5.6).

In the internal-reflector-type transflective liquid crystal display device that uses the above-described liquid crystal polymer phase retardation plate 12, the twist angle, the $\Delta$nd value, and the orientation angle of the liquid crystal polymer phase retardation plate 12 are optimized, and a difference is provided between the twist angle of the liquid crystal device and the twist angle of the liquid crystal polymer phase retardation plate and between the $\Delta$nd value of the liquid crystal device and the $\Delta$nd value of the liquid crystal polymer so that the combined birefringence of the liquid crystal polymer phase retardation plate 12 and the liquid crystal layer 6 becomes approximately equal to quarter wavelength. When no voltage is applied in the reflective display mode (OFF state), the incident light is circularly polarized at the transflective layer 7, and the circularly polarized light once again passes through the liquid crystal layer 6 and the liquid crystal polymer phase retardation plate 12 to form linearly polarized light oriented at right angles to the incident light; therefore, the liquid crystal display appears black. When a voltage is applied in the reflective display mode (ON state), the $\Delta$nd value of the liquid crystal device decreases, and the combined birefringence of the liquid crystal polymer phase retardation plate 12 and the liquid crystal layer 6 becomes nearly zero. Therefore, the incident light passed through the first polarizer arrives at the transflective layer 7 without changing its linear polarization state, and returns unchanged to the first polarizer 11 as the linearly polarized light oriented parallel to the incident light; therefore, the liquid crystal display appears white. In this case, a reflective display of good contrast can be achieved.

If the scattering layer 15 is formed using a forward scattering material having a property that allows the incident light to easily pass through it (mainly in the traveling direction of the incident light) and that exhibits good scattering performance to scatter the emerging light reflected by the reflector (i.e., to scatter the light mainly in the forward direction), the emerging light is scattered in all directions, and the visibility of the display increases. Instead of providing the scattering layer 15, the transflective layer 7 itself may be roughened to provide a scattering surface, or the protective layer 8 may be formed to have a scattering material and used as a scattering protective film.

When no voltage is applied in the transmissive display mode (OFF state), light emitted from the backlight 16 is circularly polarized by passing through the second polarizer 17 and the quarter-wave length phase retardation plate 14. The combined birefringence of the liquid crystal polymer phase retardation plate 12 and the liquid crystal device 30 is approximately equal to quarter wavelength. The quarter-wave length phase retardation plate 14 is oriented at such an angle that the phase retardation value of the liquid crystal polymer phase retardation plate 12, the liquid crystal layer 6, and the quarter-wave length phase retardation plate 14 combined becomes nearly zero. The light is converted back to the linearly polarized light when passed through the liquid crystal polymer phase retardation plate 12, but since the transmission axis of the second polarizer 17 is oriented at right angles to the transmission axis of the first polarizer 11, the transmitted light is absorbed by the first polarizer 11, and thus the liquid crystal display appears black. When a voltage is applied in the transmissive display mode (ON state), the combined birefringence of the liquid crystal polymer phase retardation plate 12 and the liquid crystal layer 6 becomes nearly zero; as a result, the light emitted from the backlight 16 and circularly polarized by the quarter-wave length phase retardation plate 14 arrives unchanged at the first polarizer 11, and thus the liquid crystal display appears white.

However, the circularly polarized light emerging from the quarter-wave length phase retardation plate 14 is difficult to compensate over the entire visible wavelength range by using both the liquid crystal device 30 and the liquid crystal polymer phase retardation plate 12. Accordingly, in the transmissive display mode, it has been difficult to achieve perfect black, and hence the first problem that sufficient contrast cannot be obtained. Further, of the light emitted from the backlight 16, the light reflected by the unopened portions of the transflective layer 7 and returned in the direction of the backlight is rotated 90° by passing through the quarter-wave length phase retardation plate 14 twice, and is therefore absorbed by the second polarizer. Hence, there has also been the second problem that the display becomes dark.

To address the second problem, there is proposed a transflective liquid crystal display device in which the transflective layer is provided with a patterning phase retardation layer.

FIG. 16 shows one example of such a transflective liquid crystal display device in which the transflective layer is provided with a patterning phase retardation layer (refer to JP-A-2003-279957).

In the liquid crystal display device shown in FIG. 16, the patterning phase retardation layer 9 whose phase retardation value is approximately equal to quarter wavelength is provided on the unopened portions of the transflective layer 7. Another feature of the liquid crystal display device shown in FIG. 16 is that the phase retardation plate between the first substrate 1 and the second polarizer 17 and the phase retardation plate or the liquid crystal polymer phase retardation plate between the second substrate 2 and the first polarizer 11 are eliminated.

In the liquid crystal display device shown in FIG. 16, the birefringence of the liquid crystal device 31, in the absence of an applied voltage (OFF state), is set approximately equal to one-quarter wavelength, while in the presence of an applied voltage (ON state), the liquid crystal molecules stand up perfectly and the birefringence thus becomes nearly zero. In the ON state of the reflective display mode, the combined phase retardation value of the liquid crystal layer 6 and the patterning phase retardation layer 9 is equal to quarter wavelength. Accordingly, the incident light entering the liquid crystal display device is circularly polarized at the transflective layer 7, and the reflected light passes through the patterning phase retardation layer 9 and the liquid crystal layer 6, and is thus converted into linearly polarized light oriented at right angles to the incident light, so that the light is absorbed by the first polarizer 11, and thus the liquid crystal display appears black. On the other hand, in the OFF state of the reflective display mode, the combined phase retardation value of the liquid crystal layer and the patterning phase retardation layer is zero. Accordingly, the incident light returns to the first polarizer 11 without changing its polarization state, so that the light passes through the first polarizer, and thus the liquid crystal display appears white. That is, the liquid crystal display device shown in FIG. 16 has a normally white mode in which the display is white in the absence of an applied voltage.

In the ON state of the transmissive display mode, as the patterning phase retardation layer 9 is not formed on the openings of the transflective layer 7, the light emitted from the backlight 16 and passed through the second polarizer 17 directly enters the liquid crystal layer 6. Here, as the transmission axis of the second polarizer 17 is oriented at right angles to the transmission axis of the first polarizer 11, the birefringence of the liquid crystal layer 6 is zero, and the incident light is absorbed by the first polarizer 11; therefore, the liquid crystal display appears black. In the OFF state of the transmissive display mode, since the birefringence of the liquid crystal layer is approximately equal to quarter wavelength, the light passed through the liquid crystal layer 6 is circularly polarized and passes through the first polarizer 11. Therefore, the liquid crystal display appears white.

On the other hand, of the light passed through the second polarizer 17, the light reflected by the unopened portions of the transflective layer 7 returns toward the backlight without changing its polarization state, because the quarter-wave length phase retardation plate 14 provided in the internal-reflector-type transflective liquid crystal display device shown in FIG. 15 is not provided here; therefore, the light once again passes through the second polarizer 17 and returns to the backlight 16. As the light returned to the backlight 16 is reflected by the backlight toward the liquid crystal display device, a bright transmissive display can be obtained.

FIG. 17 shows an example in which, in order to improve the contrast of the reflective display, a half-wave length phase retardation plate 19 is provided between the second substrate 2 and the first polarizer 11 in the liquid crystal display device shown in FIG. 16 (refer to JP-A-2003-279956).

In the liquid crystal display device shown in FIG. 17, the retardation value of the half-wave length phase retardation plate 19 is 0.28 μm which is about half of a green light wavelength of 0.55 μm, and the retardation value of the patterning phase retardation layer 9 is 0.14 μm which is approximately equal to quarter wavelength; here, the axes of the half-wave length phase retardation plate 19 and the patterning phase retardation layer 9 are oriented at about 60° to each other. With the phase retardation and the chromatic dispersion characteristics of the patterning phase retardation layer and the half-wave length phase retardation plate combined, the so-called broadband circular polarization phase retardation plate is constructed in which the retardation value for the shorter wavelength is smaller than the retardation value for the longer wavelength. Accordingly, in the ON state of the reflective display mode, the birefringence of the liquid crystal device 32 is zero, so that the incident light entering through the first polarizer 11 is converted into circularly polarized light over the entire visible wavelength range by the half-wave length phase retardation plate 19 and the patterning phase retardation layer 9, and reflected by the unopened portions of the transflective layer 7. The light reflected by the unopened portions of the transflective layer 7 once again passes through the patterning phase retardation layer 9 and the half-wave length phase retardation plate 19 and is thus converted into linearly polarized light oriented at right angles to the incident light over the entire visible wavelength range; therefore, the light is absorbed by the first polarizer 11. Accordingly, the liquid crystal display device shown in FIG. 17 can achieve a higher-contrast reflective display than the liquid crystal display device shown in FIG. 16.

SUMMARY OF THE INVENTION

However, none of the above-described techniques completely solve the problem, of the internal-reflector-type transflective liquid crystal display device, that sufficient contrast cannot be obtained in the transmissive display mode. That is, in the liquid crystal display device shown in FIG. 15, as the quarter-wave length phase retardation plate 14 is interposed between the liquid crystal device and the backlight, the polarization state of the light passed through the quarter-wave length phase retardation plate 14 is difficult to compensate for over the entire visible wavelength range by using the liquid crystal layer 6 and the liquid crystal polymer phase retardation plate 12. Therefore, perfect black cannot be achieved, leading to the problem that the transmissive contrast degrades.

On the other hand, in the liquid crystal display devices shown in FIGS. 16 and 17, a high-contrast bright transmissive display can be achieved because the quarter-wave length phase retardation plate is not provided between the liquid crystal device and the backlight. However, as the liquid crystal display devices shown in FIGS. 16 and 17 produce a white display state (clear display state) when no voltage is applied to the liquid crystal (normally white mode), the birefringence of the liquid crystal device must be reduced completely to zero if a good black display state is to be achieved. For this purpose, the liquid crystal molecules must be caused to stand up perfectly by applying a high voltage to the liquid crystal device and, hence, a problem, that direct matrix driving is difficult, appears.

It is an object of the present invention to provide a liquid crystal display device, in particular, a transflective liquid crystal display device of internal reflector type, that solves the above problems.

That is, it is an object of the present invention to provide a liquid crystal display device, in particular, a transflective liquid crystal display device of internal reflector type, that can achieve high contrast in transmissive display mode even in the case of low voltage driving.

It is a further object of the present invention to provide a liquid crystal display device, in particular, a transflective liquid crystal display device of internal reflector type, that can achieve a bright transmissive display and that is free from shadows in the display.

A liquid crystal display device according to the present invention comprises a first polarizer, a second polarizer, a liquid crystal cell having a liquid crystal layer provided between a first substrate and a second substrate, a transflective layer provided within the liquid crystal cell and having openings, a patterning phase retardation layer provided within the liquid crystal cell and having retardation in portions other than the portions where the openings of the transflective layer are formed, and an optical element for compensating an optical property of the liquid crystal layer, the optical device being provided between the first polarizer and the liquid crystal cell and nearer to the first polarizer than the transflective layer.

Preferably, in the liquid crystal display device according to the present invention, $\Delta nd$, that represents birefringence of the optical element, is approximately equal to $\Delta nd$ given by the product of birefringence $\Delta n$ of the liquid crystal layer and cell gap d of the liquid crystal layer.

Preferably, in the liquid crystal display device according to the present invention, the optical element is oriented at such an angle as to compensate the optical property of the liquid crystal layer.

Preferably, in the liquid crystal display device according to the present invention, the optical element is a liquid crystal polymer phase retardation plate.

Preferably, in the liquid crystal display device according to the present invention, the liquid crystal layer is formed from a twisted nematic liquid crystal, wherein the liquid crystal polymer phase retardation plate has a twisted orientation whose twist handedness is opposite to the twist handedness of the liquid crystal layer, and whose twist angle is approximately equal in absolute value to the twist angle of the liquid crystal layer, and wherein the patterning phase retardation layer is located between the transflective layer and the liquid crystal layer, and has retardation value approximately equal to a quarter wavelength.

Preferably, in the liquid crystal display device according to the present invention, the liquid crystal layer is formed from a twisted nematic liquid crystal, wherein the liquid crystal polymer phase retardation plate has a twisted orientation whose twist handedness is opposite to the twist handedness of the liquid crystal layer, and whose twist angle is approximately equal in absolute value to the twist angle of the liquid crystal layer, and wherein the patterning phase retardation layer is located between the liquid crystal layer and the second substrate, and has retardation value approximately equal to a quarter wavelength.

Preferably, in the liquid crystal display device according to the present invention, the liquid crystal layer is formed from a nematic liquid crystal of homogeneous orientation, wherein the liquid crystal polymer phase retardation plate has homogeneous orientation, and is oriented at right angles to the liquid crystal layer, and wherein the patterning phase retardation layer is located between the transflective layer and the liquid crystal layer, and has retardation value approximately equal to a quarter wavelength.

Preferably, in the liquid crystal display device according to the present invention, the liquid crystal layer is formed from a nematic liquid crystal with a homogeneous orientation, wherein the liquid crystal polymer phase retardation plate has a homogeneous orientation, and is oriented at right angles to the liquid crystal layer, and wherein the patterning phase retardation layer is located between the liquid crystal layer and the second substrate, and has retardation value approximately equal to a quarter wavelength.

Preferably, the liquid crystal display device according to the present invention further comprises a scattering layer on an outside of the second substrate.

Preferably, the liquid crystal display device according to the present invention further comprises color filters of a plurality of colors provided on either the first substrate or the second substrate.

Preferably, in the liquid crystal display device according to the present invention, the patterning phase retardation layer has substantially the same thickness in the partial opening of the transflective layer.

Preferably, the liquid crystal display device according to the present invention further comprises a reflective polarizer on an outside of the second polarizer, the reflective polarizer having a transmission axis oriented substantially parallel to the transmission axis of the second polarizer.

A liquid crystal display device according to another preferred mode of the present invention comprises a first polarizer, a liquid crystal cell with a liquid crystal provided between a first substrate and a second substrate, and a second polarizer, wherein the liquid crystal cell includes a transflective layer which has openings and a patterning phase retardation layer which has retardation in unopened portions where the openings of the transflective layer are not formed, and the liquid crystal display device further comprises a liquid crystal polymer phase retardation plate provided between the first polarizer and the liquid crystal cell and nearer to the first polarizer than the transflective layer, wherein Δnd that represents birefringence of the liquid crystal polymer phase retardation plate is approximately equal to Δnd of the liquid crystal cell, and the liquid crystal polymer phase retardation plate is oriented so as to compensate the birefringence occurring in the liquid crystal cell.

In the liquid crystal display device of the present invention, the wavelength dependence of the refractive index of the liquid crystal polymer phase retardation plate is close to that of the liquid crystal layer, and the liquid crystal polymer phase retardation plate can be set to have a twisted orientation; therefore, with the provision of the first means, the birefringence of the liquid crystal layer can be completely compensated by the liquid crystal polymer phase retardation plate. That is, in the OFF state when no voltage is applied, the phase difference can be reduced to zero over the entire visible wavelength range. This offers the effect of being able to achieve perfect black, and hence high contrast, in the OFF state of the transmissive display mode. Further, since the display is a normally black mode display in which the display is black in the absence of an applied voltage, perfect black is obtained at low voltage; furthermore, as there is no need to cause the liquid crystal molecules to stand up perfectly to achieve a white display state, an effect that the driving voltage is low and a good display can be achieved even in the case of direct matrix driving is possible.

Further, since the present invention eliminates the need for the quarter-wave length phase retardation plate provided between the first substrate and the second polarizer in the conventional transflective liquid crystal display device of internal reflector type, of the light passed through the second polarizer the light not passed through the transflective layer is reflected without changing its polarization state, and thus the reflected light is allowed to pass through the second polarizer and is reflected once again by the backlight; with this effect, in which the light returning to the backlight is directed back to the panel side, the invention offers the effect of being able to achieve a bright transmissive display.

DESCRIPTION OF THE PREFERRED EMBODIMENTS

The structures and operations of preferred liquid crystal display devices for carrying out the present invention, in particular, transflective liquid crystal display devices of an internal reflector type having a reflective layer within a liquid crystal device, will be described below with reference to the drawings.

First, a transflective liquid crystal display device according to a first embodiment of the present invention will be described below.

Figure 1:
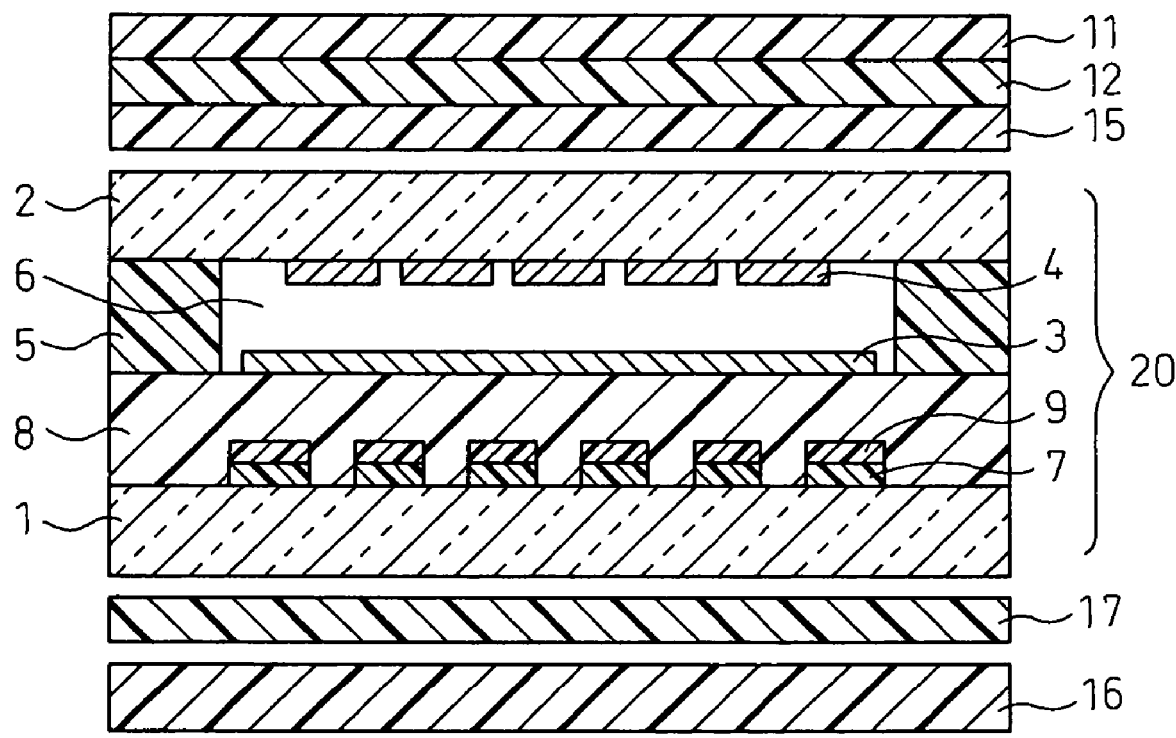
FIG. 1 is a cross-sectional view showing the structure of a transflective liquid crystal display device according to a first embodiment of the present invention.

FIG. 1 is a cross-sectional view showing the structure of the transflective liquid crystal display device according to the first embodiment of the present invention.

The transflective liquid crystal display device of this embodiment is characterized by the provision of a patterning phase retardation layer 9 within a liquid crystal device 20 and the provision of a liquid crystal polymer phase retardation plate 12 above the liquid crystal device 20. As shown in FIG. 1, the liquid crystal device 20 comprises: a first substrate 1 on which are formed a transflective layer 7, the patterning phase retardation layer 9, a protective layer 8 deposited over the transflective layer 7 and the patterning phase retardation layer 9, and first electrodes 3; a second substrate 2 with second electrodes 4 formed thereon; a seal member 5 for bonding the first and second substrates 1 and 2 together; and a liquid crystal layer 6 formed from a twisted nematic liquid crystal sandwiched between the first and second substrates 1 and 2.

The liquid crystal display device shown in FIG. 1 further includes: the liquid crystal polymer phase retardation plate 12 and a first polarizer 11 provided above the liquid crystal device 20; and a second polarizer 17 and a backlight 16 provided below the liquid crystal device 20. In the liquid crystal display device shown in FIG. 1, a scattering layer 15 is provided on the outside of the second substrate, but this layer may be omitted.

Figure 2:
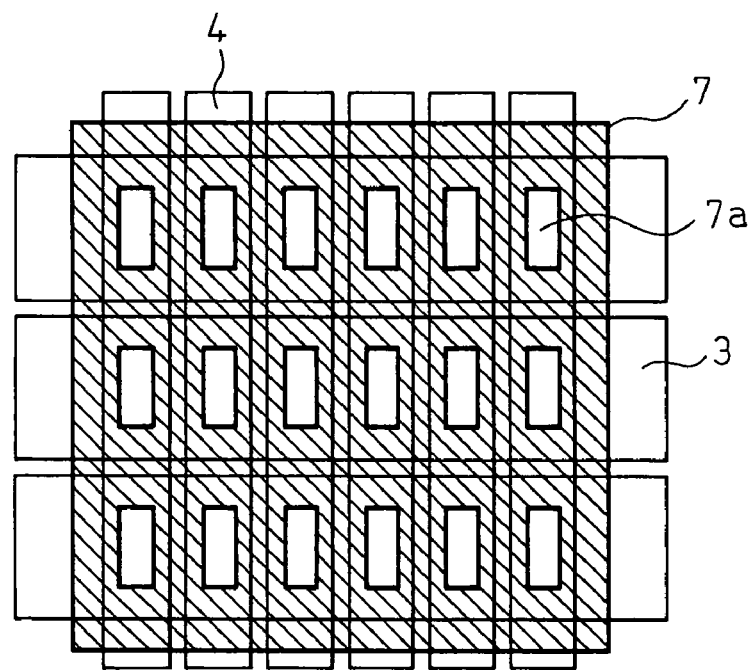
FIG. 2 is an enlarged plan view showing a pixel section in the transflective liquid crystal display device according to the first embodiment of the present invention.

FIG. 2 is an enlarged plan view showing a pixel section in the liquid crystal display device of FIG. 1.

As shown in FIG. 2, pixels are formed at the intersections of the first and second electrodes 3 and 4. Opening 7a, each aligned with the center portion of a pixel, are formed in the transflective layer 7 by photo etching. As the combined area of the openings 7a becomes larger, the brightness of the transmissive display which uses the backlight increases; conversely, as the combined area of the openings 7a becomes larger, the brightness of the reflective display which does not use the backlight decreases. For example, if the combined area of the openings 7a accounts for 30% of the total area of the transflective film 7, the transflective film 7 transmits about 30% of the incident light and reflects the remaining 70%.

The liquid crystal display device shown in FIGS. 1 and 2 is called the internal-reflector-type transflective liquid crystal display device, and is capable of operating in the reflective display mode which uses ambient light incident from the first polarizer side, as well as in the transmissive display mode which uses the backlight 16. Further, a sharp reflective display free from parallax can be obtained, because the reflective layer is formed within the liquid crystal device. The liquid crystal polymer phase retardation plate 12 has a twisted orientation whose twist handedness is opposite to that of the liquid crystal layer, and functions as a so-called twisted phase retardation plate. In the liquid crystal display device shown in FIGS. 1 and 2, the twist angle and Δnd of the liquid crystal polymer phase retardation plate 12 are set approximately equal to the twist angle and Δnd of the liquid crystal layer 6, and the liquid crystal polymer phase retardation plate 12 is oriented at such an angle that the birefringence occurring in the liquid crystal layer 6 is completely compensated.

Figure 3:
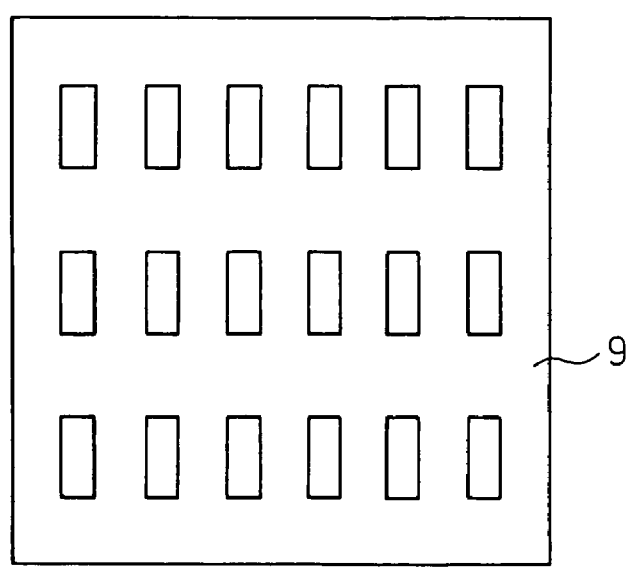
FIG. 3 is an enlarged plan view showing a patterning phase retardation layer in the transflective liquid crystal display device according to the first embodiment of the present invention.

FIG. 3 is a plan view of the patterning phase retardation layer in the liquid crystal display device shown in FIG. 1.

As shown in FIG. 3, the patterning phase retardation layer 9 is not formed on the openings 7a of the transflective layer 7, but formed only on the unopened portions of the transflective layer 7. The patterning phase retardation layer 9 provides a phase retardation of 0.14 μm which is about quarter of a green light wavelength of 0.55 μm.

Figure 4:
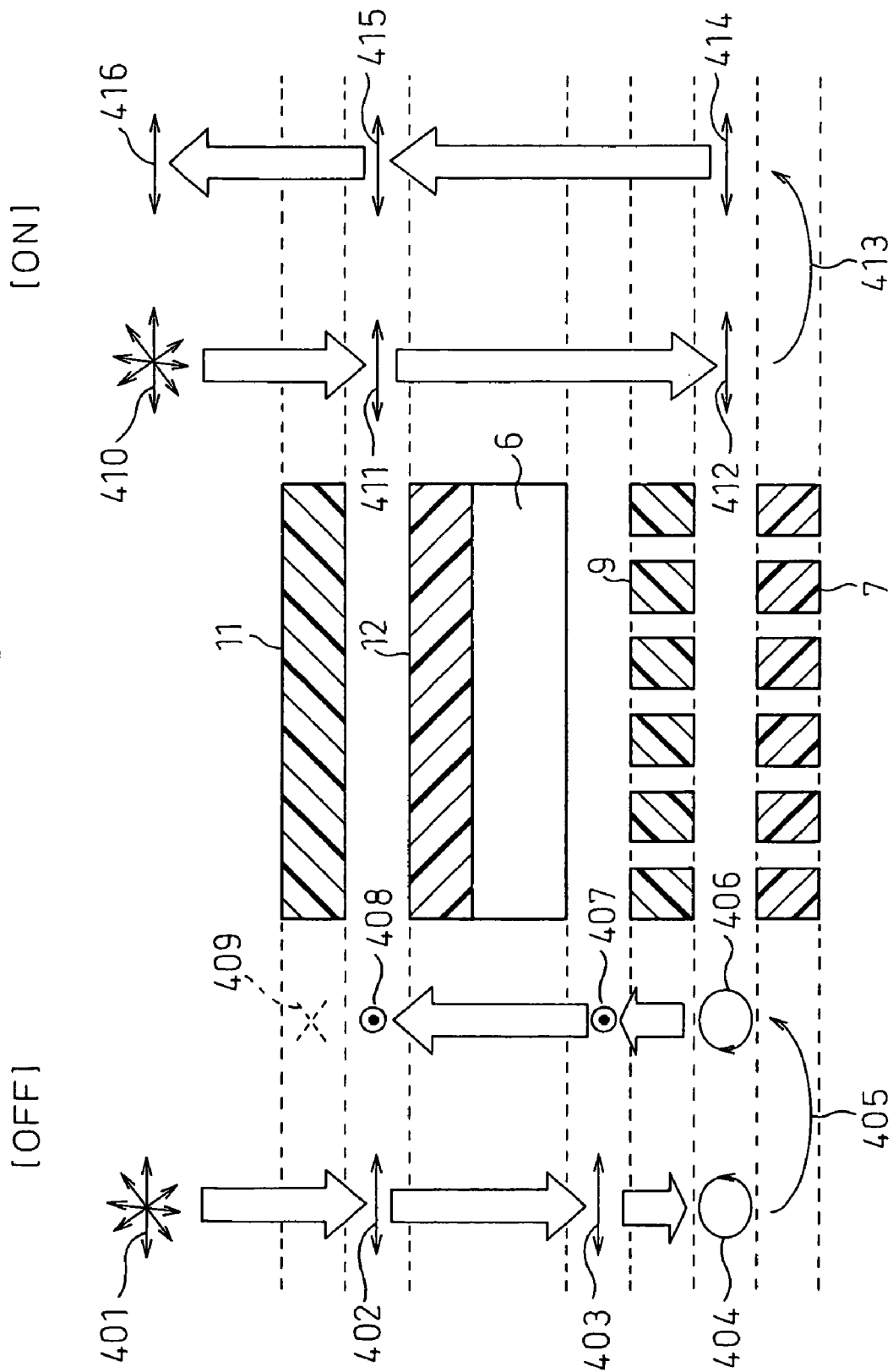
FIG. 4 is a drawing for explaining the reflective display mode and transmissive display mode of the liquid crystal display device shown in FIG. 1.

FIG. 4 is a diagram for explaining the reflective display mode and transmissive display mode of the liquid crystal display device shown in FIG. 1.

First, the reflective display mode will be described. Ambient light (401) entering the first polarizer 11 is converted into linearly polarized light (402). When no voltage is applied (OFF state), since the combined birefringence of the liquid crystal polymer phase retardation plate 12 and the liquid crystal layer 6 is nearly zero, the light passed through the liquid crystal polymer phase retardation plate 12 and the liquid crystal layer 6 remains linearly polarized (403). The light passed through the liquid crystal polymer phase retardation plate 12 and the liquid crystal layer 6 is circularly polarized (404) by passing through the patterning phase retardation layer 9, and reflected by the transflective layer 7 (405). Since the phase of the light is rotated by 180° on reflection, the reflected light is circularly polarized light rotating in the opposite sense (406). The light reflected by the transflective layer 7 once again passes through the patterning phase retardation layer 9 and is thus converted into linearly polarized light (407) oriented at right angles to the incident light. As the combined birefringence of the liquid crystal polymer phase retardation plate 12 and the liquid crystal layer 6 is nearly zero, the light passed through the liquid crystal layer 6 and the liquid crystal polymer phase retardation plate 12 remains linearly polarized (408) and oriented at right angles to the incident light. As a result, the light passed through the liquid crystal layer 6 and the liquid crystal polymer phase retardation plate 12 is absorbed by the first polarizer 11 (409), and the display thus appears black.

When a voltage is applied (ON state), the liquid crystal molecules lying in the horizontal direction stand up obliquely upward (the long axes of the liquid crystal molecules tilt parallel to the direction of voltage application), and the birefringence of the liquid crystal layer 6 decreases by an amount approximately equal to quarter wavelength; as a result, the combined birefringence of the liquid crystal polymer phase retardation plate 12, the liquid crystal layer 6, and the patterning phase retardation layer 9 becomes nearly zero. Ambient light (410) entering the first polarizer 11 is converted into linearly polarized light (411). The linearly polarized light passed through the first polarizer 11 arrives at the transflective layer 7 (412) without changing its linear polarization state, and is reflected there (413). The phase of the light is rotated by 180° on reflection, but the light, with its linear polarization state (414) maintained substantially the same as the linearly polarized incident light, once again passes through the patterning phase retardation layer 9, the liquid crystal layer 6, and the liquid crystal polymer phase retardation plate 12 (415). The light passed through the patterning phase retardation layer 9, the liquid crystal layer 6, and the liquid crystal polymer phase retardation plate 12 remains linearly polarized in the same direction as the linearly polarized incident light and thus passes through the first polarizer 11 (416); as a result, the liquid crystal display appears white.

Next, the transmissive display mode that uses the backlight will be described. In the OFF state, light emitted from the backlight 16 passes through the second polarizer 17 and is thus converted into linearly polarized light which passes through the openings 7$a$ of the transflective layer 7. Here, the patterning phase retardation layer 9 is not formed on the openings 7$a$ of the transflective layer 7, and the combined birefringence of the liquid crystal layer 6 and the liquid crystal polymer phase retardation plate 12 is zero. As a result, the light passed through the openings 7$a$ of the transflective layer 7 arrives at the first polarizer 11 without changing its polarization state. Here, as the transmission axis of the first polarizer 11 is oriented at right angles to the transmission axis of the second polarizer 17, the light passed through the openings 7$a$ of the transflective layer 7 is absorbed by the first polarizer 11. Accordingly, in this case, the liquid crystal display appears black (dark display state).

When a voltage is applied to the liquid crystal layer (ON state), the liquid crystal molecules stand up and the birefringence of the liquid crystal layer decreases, so that the combined birefringence of the liquid crystal polymer phase retardation plate 12 and the liquid crystal layer 6 does not become zero. Accordingly, the linearly polarized light passed through the second polarizer 17 and entering the liquid crystal layer 6 is converted into elliptically or circularly polarized light and arrives at the first polarizer 11 in this condition. Since the elliptically or circularly polarized light passes through the first polarizer, the liquid crystal display appears white.

When the wavelength dependence of the refractive index of the liquid crystal polymer phase retardation plate 12 is made approximately the same as that of the liquid crystal layer 6, and when the twist of the liquid crystal polymer phase retardation plate 12 is made equal in angle but opposite in sense to the twist of the liquid crystal layer, and the liquid crystal polymer phase retardation plate 12 is oriented at such an angle as to compensate the birefringence of the liquid crystal, then it becomes possible to completely compensate for the light over the entire visible wavelength range (the combined birefringence of the liquid crystal polymer phase retardation plate 12 and the liquid crystal layer 6 can be reduced to zero for the light over the entire visible wavelength range). In this way, as a perfect black can be obtained, the liquid crystal display device according to the first embodiment of the present invention can achieve a transmissive display of higher contrast than that achieved in any internal-reflector-type transflective liquid crystal display device of the prior art.

Further, in the liquid crystal display device according to the first embodiment of the present invention, as a black display state is produced in the OFF state (normally black mode), there is no need to perform hard-to-achieve control in order to cause the liquid crystal molecules to stand up perfectly in the vertical direction to obtain perfect black in the normally white mode as in the prior art, nor is there any need to apply a high voltage in order to cause the liquid crystal molecules to stand up perfectly. As a result, the liquid crystal display device according to the first embodiment of the present invention can be driven at low voltage, and thus a high-contrast transmissive display and a good reflective display can be achieved even in the case of direct matrix driving.

Of the light emitted from the backlight 16, the light not passed through the transflective layer 7 but reflected by the unopened portions thereof once again passes through the second polarizer 17 and arrives at the backlight. The light returned to the backlight is reflected toward the liquid crystal layer by a diffusion plate or a prism sheet provided on the backlight, and once again arrives at the second polarizer 17. Some of the light passed through the second polarizer 17 now passes through the openings 7$a$ of the transflective layer because its direction changes on reflection, and the light is thus effectively utilized. The light not passed through the transflective layer once again returns to the backlight. By repeating this process (a so-called recycle effect), transmissive brightness increases, and the liquid crystal display device according to the first embodiment of the present invention can thus achieve a bright transmissive display.

Next, a method for fabricating the transflective liquid crystal display device according to the first embodiment of the present invention shown in FIGS. 1 to 6 will be described below.

As shown in FIG. 1, the liquid crystal display device of this embodiment constructed using the liquid crystal device 20, the liquid crystal polymer phase retardation plate 12 provided above the liquid crystal device 20, the first polarizer 11 provided above the liquid crystal polymer phase retardation plate 12, the second polarizer 17 provided below the liquid crystal device 20, the backlight 16 provided below the second polarizer 17, etc.

The first polarizer 11 and the liquid crystal polymer phase retardation plate 12 are bonded together by an acrylic-based adhesive. The first polarizer 11 and the liquid crystal polymer phase retardation plate 12 are then glued to the liquid crystal device 20 via the scattering adhesive layer 15 formed by mixing fine particles in an acrylic-based adhesive. The second polarizer 17 is glued to the liquid crystal device 20 by an acrylic-based adhesive.

The liquid crystal device 20 is constructed using: the first substrate 1 made of a 0.5-mm thick glass plate on which are formed the transflective layer 7 of 0.15-µm thickness made of aluminum, the patterning phase retardation layer 9 made of liquid crystal polymer, the protective layer 8 of 2-µm thickness made of an acrylic-based material, and the first electrodes 3 of 0.2-µm thickness made of ITO which is a transparent electrode material; the second substrate 2 made of a 0.5-mm thick glass plate on which the second electrodes 4 of 0.2-µm thickness made of ITO are formed; the seal member 5 for bonding the first and second substrates 1 and 2 together; and the liquid crystal layer 6 formed from a left-handed 240° twisted nematic liquid crystal provided between the first and second substrates 1 and 2.

As shown in FIG. 2, the pixels are located at the intersections of the first and second electrodes 3 and 4. Rectangular-shaped openings 7$a$, each substantially aligned with the center portion of a pixel, are formed in the transflective layer 7 by photo etching.

A method for fabricating the patterning phase retardation layer 9 will be described below.

First, an alignment layer is formed by printing or spinning over the first substrate on which the transflective layer 7 has been formed, and the layer is rubbed at a particular angle.

Then, a photosensitive liquid crystalline high-molecular monomer is applied over the alignment layer by using a spinner.

Next, the thus applied liquid crystalline high-molecular monomer is heated to a temperature of 70° C. to 90° C. higher than the isotropic temperature, and then gradually cooled to orient the liquid crystalline high-molecular monomer.

Then, using a photomask, only the unopened portions of the transflective layer 7 are exposed to UV radiation, to polymerize the liquid crystalline high-molecular monomer.

The pattern is then developed by using an organic solvent which dissolves the unpolymerized liquid crystalline high-molecular monomer, thus forming the patterning phase retardation layer 9 with a thickness of about 0.1 μm and a phase retardation value of 140 nm only on the unopened portions (reflective portions) of the transflective layer 7, as shown in FIG. 1 or 3.

A method for fabricating the liquid crystal polymer phase retardation plate 12 will be described below.

A liquid crystalline high-molecular polymer having a twisted structure is first oriented, and then applied over a triacetyl cellulose (TAC) film.

Next, the liquid crystalline high-molecular polymer applied over the TAC film is changed to the liquid crystal state by heating it at a high temperature of about 150° C., and the twist angle is adjusted.

Thereafter, the polymer is rapidly cooled to room temperature to fix its twisted state, to complete the fabrication of the liquid crystal polymer phase retardation plate 12.

The liquid crystal polymer phase retardation plate 12 may also be fabricated by the following method.

First, an alignment layer is rubbed in a particular orientation.

Then, a liquid crystalline high-molecular polymer is applied over the thus oriented alignment layer made of PET or the like, and its twisted state is fixed.

Next, the liquid crystalline high-molecular polymer is transferred from the alignment layer to a TAC film to form the liquid crystal polymer phase retardation plate 12.

In the present embodiment, the twist angle Tc of the liquid crystal polymer phase retardation plate 12 is −240°, and when the Δnd value representing the birefringence of the liquid crystal polymer phase retardation plate 12 is defined as Rc, then Rc is 0.80 μm (right handed).

It is preferable that the first and second polarizers 11 and 17 be as bright as possible and have a high polarization efficiency; in the present embodiment, a material having a transmittance of 45% and a polarization efficiency of 99.9% is used. It is preferable that a anti-reflective layer having a reflectance of about 0.5% be provided on the surface of the first polarizer 11. The reason is that, when the anti-reflective layer is provided, the surface reflectivity of the first polarizer 11 is reduced, reducing the black level in the reflective mode and thus improving the reflective contrast. The anti-reflective layer is formed by depositing an inorganic film consisting of a plurality of layers of different refractive indices by using a evaporation process or a sputtering process.

The backlight 16 is constructed using a fluorescent tube or an LED as a light source, the construction being such that the light from the light source is introduced into a light guiding plate and emerges from the light guiding plate. The backlight may be constructed using a light source for direct illumination, a reflector, a diffuser, etc., or a self-luminous flat panel light source such as an electroluminescent (EL) panel may be used. The present embodiment uses a white backlight with a white light emitting LED mounted to a light guiding plate about 1 mm in thickness.

Figure 5:
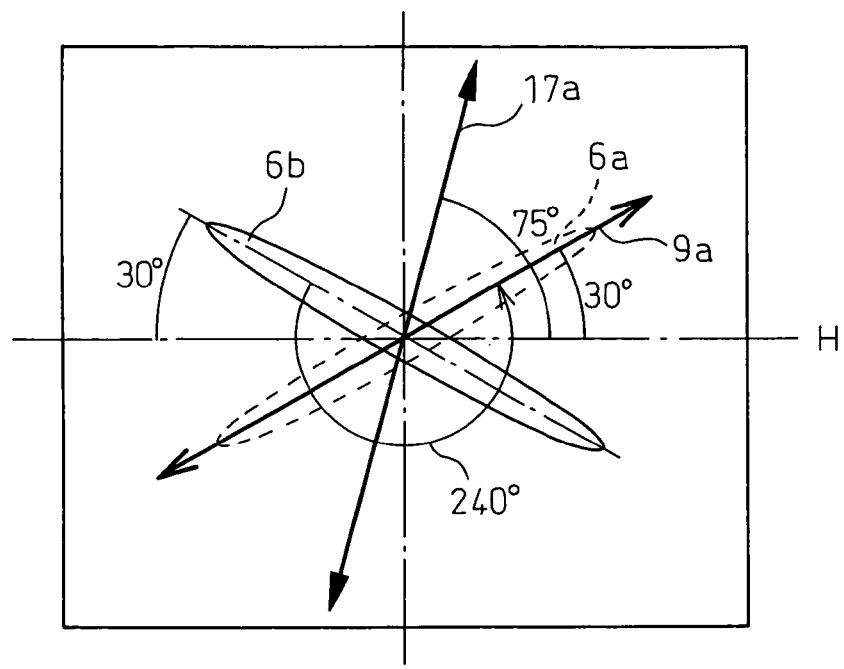
FIG. 5 is a drawing showing how component elements are oriented relative to each other in the transflective liquid crystal display device according to the first embodiment of the present invention.
Figure 6:
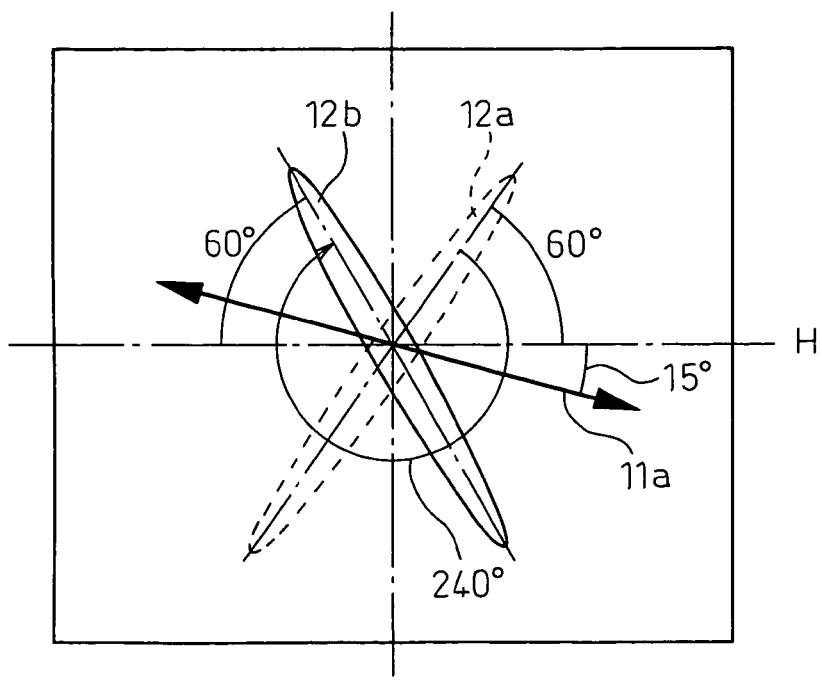
FIG. 6 is a drawing showing how component elements are oriented relative to each other in the transflective liquid crystal display device according to the first embodiment of the present invention.

FIG. 5 shows the relative orientations of the liquid crystal device 20 and the component members provided below the liquid crystal device 20, and FIG. 6 shows the relative orientations of the component members provided above the liquid crystal device 20.

An alignment layer (not shown) is formed on the surface of each of the first and second electrode layers 3 and 4 and, as shown in FIG. 5, as the first substrate 1 is rubbed in a direction 30° upward to the right relative to the horizontal axis H, the molecular alignment direction 6a of the lower liquid crystal is +30°; on the other hand, since the second substrate 2 is rubbed in a direction 30° downward to the right, the molecular alignment direction 6b of the upper liquid crystal is −30°. An optically active substance called a chiral material is added in a nematic liquid crystal having a viscosity of 20 cp, and the twist pitch is adjusted to 11 μm, to fabricate the liquid crystal device 20 of STN mode having a left-handed twist angle Ts of 240°.

The birefringence difference Δn of the nematic liquid crystal used is 0.15, and the cell gap d between the first substrate 1 and the second substrate 2 is set to 5.4 μm. Accordingly, the Δnd value (Rs) representing the birefringence of the liquid crystal device 20, and given by the product of the birefringence difference Δn of the nematic liquid crystal and the cell gap d, is 0.81 μm.

As shown in FIG. 6, the transmission axis 11a of the first polarizer 11 is oriented at −15° relative to the horizontal axis H. As the lower molecular alignment direction 12a of the liquid crystal polymer phase retardation plate 12 is oriented at +60° relative to the horizontal axis H, and the upper molecular alignment direction 12b is oriented at −60° relative to the horizontal axis H, the right-handed twist angle Tc is 240°. Therefore, the absolute difference ΔT between the twist angles (=twist angle (Ts) of the liquid crystal device–twist angle (Tc) of the liquid crystal polymer phase retardation plate) is 0°, and the birefringence difference ΔR (Rs of the liquid crystal device–Rc of the liquid crystal polymer phase retardation plate) is 0.01 μm, i.e., nearly zero. By orienting the lower molecular alignment direction 12a of the liquid crystal polymer phase retardation plate 12 at right angles to the molecular alignment direction 6b of the upper liquid crystal in the liquid crystal device as described above, the birefringence occurring in the liquid crystal device can be completely compensated for by the liquid crystal polymer phase retardation plate 12.

As shown in FIG. 5, the transmission axis 17a of the second polarizer 17 provided below the liquid crystal device 20 is oriented at +75° relative to the horizontal axis H, that is, at right angles to the transmission axis 11a of the first polarizer 11. As shown in FIGS. 5 and 6, the patterning phase retardation layer is formed so that its phase retardation axis 9a is oriented at +30° relative to the horizontal axis H. Accordingly, the orientation angle between the phase retardation axis 9a of the patterning phase retardation layer and the transmission axis 11a of the first polarizer 11 shown in FIG. 6 is 45°, the angle where a phase difference occurs most easily.

The operating principles of the reflective mode and the transmissive mode of the liquid crystal display device according to the present embodiment have already been described, and therefore, will not be repeated here. Next, the effect of the patterning phase retardation layer will be briefly described once again. In the present embodiment, the patterning phase retardation layer is not formed on the openings 7a of the transflective layer, but is formed only on the unopened portions thereof. As a result, only the unopened portions of the transflective layer are subjected to the phase retardation effect of the patterning phase retardation layer. Accordingly, the present embodiment permits an optical design similar to that employed in the conventional transmissive liquid crystal display device, not that employed in the conventional internal-reflector-type transflective display device. In the present embodiment, the liquid crystal device 20 is completely compensated for by the liquid crystal polymer phase retardation plate 12, and the combined birefringence of the liquid crystal polymer phase retardation plate 12 and the liquid crystal device 20 is thus set nearly zero. As a result, in the transmissive display mode of the present embodiment, light of all wavelengths can be blocked and a high-contrast image can be obtained. Further, in the present embodiment, as the black display state is produced in the OFF state (normally black mode), the driving voltage is low, and good contrast can be obtained even in the case of direct matrix driving.

Figure 15:
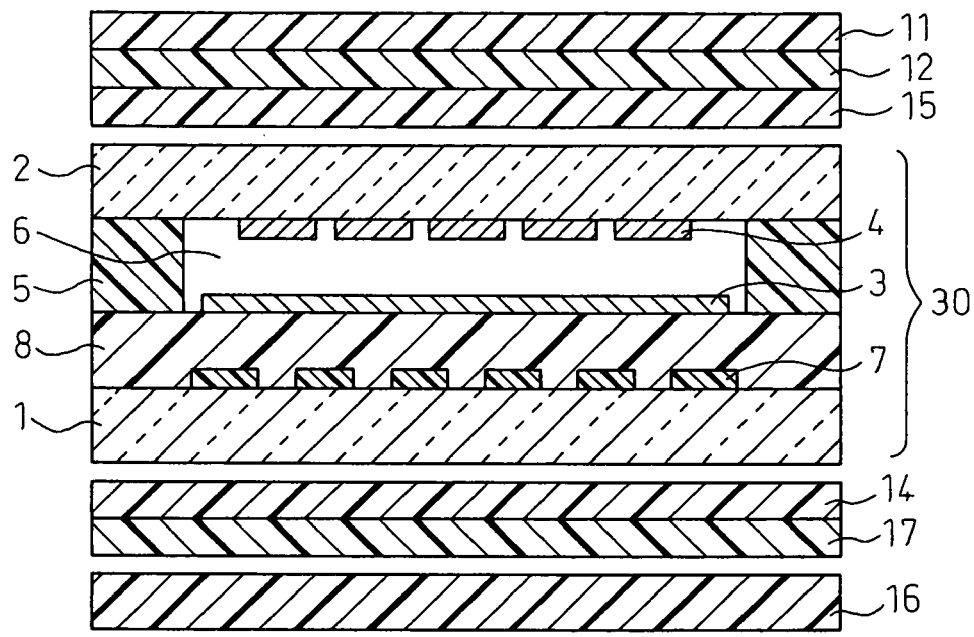
FIG. 15 is a cross-sectional view showing the structure of a transflective liquid crystal display device of internal reflector type.
Figure 16:
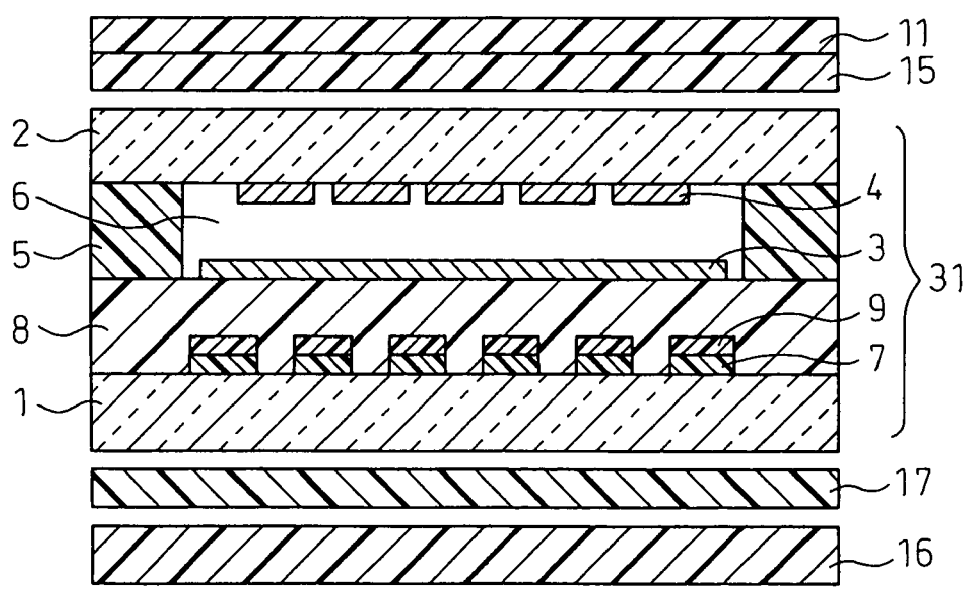
FIG. 16 is a cross-sectional view showing the structure of a transflective liquid crystal display device provided with a patterning phase retardation layer.

In the internal-reflector-type transflective liquid crystal display device shown in FIG. 15, as the quarter-wave length phase retardation plate is interposed between the second polarizer and the transflective layer, the light incident from the second polarizer and reflected by the unopened portions of the transflective layer toward the backlight is rotated 90° by passing through the quarter-wave length phase retardation plate twice, and is, therefore, absorbed by the second polarizer. In contrast, in the present embodiment, since there is no quarter-wave length phase retardation plate between the second polarizer and the transflective layer, the linearly polarized light incident from the second polarizer and reflected by the unopened portions of the transflective layer toward the backlight is allowed to pass through the second polarizer because the reflected light is linearly polarized light oriented in the same direction as the incident light. As the light passed through the second polarizer is reflected by the surface of the backlight 16 and used again for backlighting, the present embodiment can achieve a bright transmissive display (recycle effect). For example, the transmissive contrast of the internal-reflector-type transflective liquid crystal display device shown in FIG. 15 was 20 to 30, compared with the transmissive contrast of 50 to 100 achieved by the transflective liquid crystal display device of the present invention. Further, the transflective liquid crystal display device of the present invention achieves a brightness of about 1.3 times as high as that of the internal-reflector-type transflective liquid crystal display device shown in FIG. 15.

The backlight more specifically comprises a fluorescent tube or a light-emitting diode as a light source disposed below the liquid crystal device; a reflective member, disposed below the light source, for reflecting at least the light emitted downward from the light source back into the direction of the liquid crystal device; a diffuser layer provided between the light source and the liquid crystal device; and a panel-like light guiding member, provided below the liquid crystal device, for guiding the light from the light source over the entire surface area. The bottom surface of the light guiding member functions as a reflector or a diffuse reflector. The fluorescent tube or the light-emitting diode as the light source is located facing an edge of the light guiding member. The light entering through the edge of the light guiding member is guided through the light guiding member and emitted toward the liquid crystal device.

When the light is reused as described above, the light returning to the light guiding member by passing through the second polarizer is reflected by the diffuser layer provided between the light source and the liquid crystal device, the upper surface of the light guiding member, or the reflector or diffuse reflector provided on the bottom surface of the light guiding member, and is redirected toward the second polarizer. In this case, if a roughened surface is provided on the side of the light guiding member that faces the liquid crystal device, the efficiency of the light reuse increases. The efficiency of the light reuse can also be increased by providing a diffuser or a prism sheet on the side of the light guiding member that faces the liquid crystal device.

An electroluminescent panel may be used as the backlighting source.

On the other hand, the patterning phase retardation layer 9 is formed on the unopened portions of the reflective layer. The retardation value of the patterning phase retardation layer 9 is approximately equal to quarter wavelength, and the patterning phase retardation layer 9 is a so-called circular polarization phase retardation layer. In the reflective mode, as the phase retardation axis 9a of the patterning phase retardation layer 9 is oriented at 45° relative to the transmission axis 11a of the first polarizer, the linearly polarized light incident from the first polarizer is circularly polarized by passing through the patterning phase retardation layer 9, and reflected by the transflective layer 7 upon which the direction of rotation of the circularly polarized light is reversed. The light reflected by the transflective layer 7 once again passes through the patterning phase retardation layer 9 and is thus converted into linearly polarized light oriented at right angles to the incident light; therefore, the light is absorbed by the first polarizer 11, and the liquid crystal display appears black. However, since the patterning phase retardation layer 9 has wavelength dependence, it is difficult to convert the linearly polarized incident light into perfectly circularly polarized light over the entire wavelength range. Accordingly, in the reflective display mode, the contrast of the liquid crystal display is about 7 to 10.

In this way, according to the liquid crystal display device of the present embodiment comprising the first polarizer 11, the liquid crystal polymer phase retardation plate 12, the liquid crystal device 20 containing the patterning phase retardation layer 9 and the transflective layer 7, and the second polarizer 17, high contrast can be obtained even at low driving voltage, and a bright transmissive display can be achieved. Further, according to the present invention, since the reflective display is implemented utilizing the internal reflector structure, a transflective liquid crystal display device without having a parallax can be achieved.

In the present embodiment, an STN mode liquid crystal device having a twist angle of 240° has been used as the liquid crystal device 20. However, a TN mode liquid crystal device having a twist angle of about 90° may also used as the liquid crystal device 20. In that case, by setting the liquid crystal polymer phase retardation plate to have a twist angle of 90°, i.e., the same angle as the twist angle of the liquid crystal device, a transflective liquid crystal display device, similar to that achieved by using the STN mode liquid crystal device having a twist angle of 240°, can be achieved.

In the present embodiment, the scattering layer 15 has been provided above the liquid crystal device 20, but instead of providing the scattering layer 15, a roughened surface may be provided on the transflective layer 7. Alternatively, instead of providing the scattering layer 15, the protective layer 8 may be formed to have a scattering surface and used as a scattering protective film.

In the present embodiment, a liquid crystalline polymer film having a fixed twisted state at room temperature has been used as the liquid crystal polymer phase retardation plate 12, but instead, use may be made of a temperature compensation liquid crystal polymer phase retardation plate in which some of the liquid crystal molecules are just linked to chain polymer molecules and Δnd varies with temperature. In that case, brightness and contrast at high and low temperatures improve, and a transflective liquid crystal display device with improved characteristics can be achieved.

In the present embodiment, a thin aluminum film has been used as the transflective layer 7, but instead of the thin aluminum film, a thin film of aluminum alloy or silver alloy may be used, or in order to improve the reflectance or protect the surface, a multilayer film of inorganic oxides such as $SiO_2$ and $TiO_2$ may be formed on the surface of the aluminum after forming the openings therein.

In the present embodiment, the reflective layer 7 has been formed separately from the first electrodes 3, but instead, reflective electrodes that function as the first electrodes as well as the transflective layer 7 may be formed in the unopened portions of the transflective layer by using a thin metal film of aluminum, silver, or the like, while forming transparent electrodes in the opened portions of the transflective layer. Further, if the transflective layer 7 is formed on the outside of the first substrate 1, shadows occur in the display, but this arrangement offers the effect of increasing the transmittance and being able to achieve a high-contrast transmissive display.

A transflective liquid crystal display device according to a second embodiment of the present invention will be described below. The transflective liquid crystal display device of the second embodiment differs from the transflective liquid crystal display device of the first embodiment in that the transflective liquid crystal display device of the second embodiment is provided with color filters on the first substrate to achieve a color display, in that a reflective polarizer is provided on the outside of the second polarizer, and in that the patterning phase retardation layer is fabricated by a different method.

Figure 7:
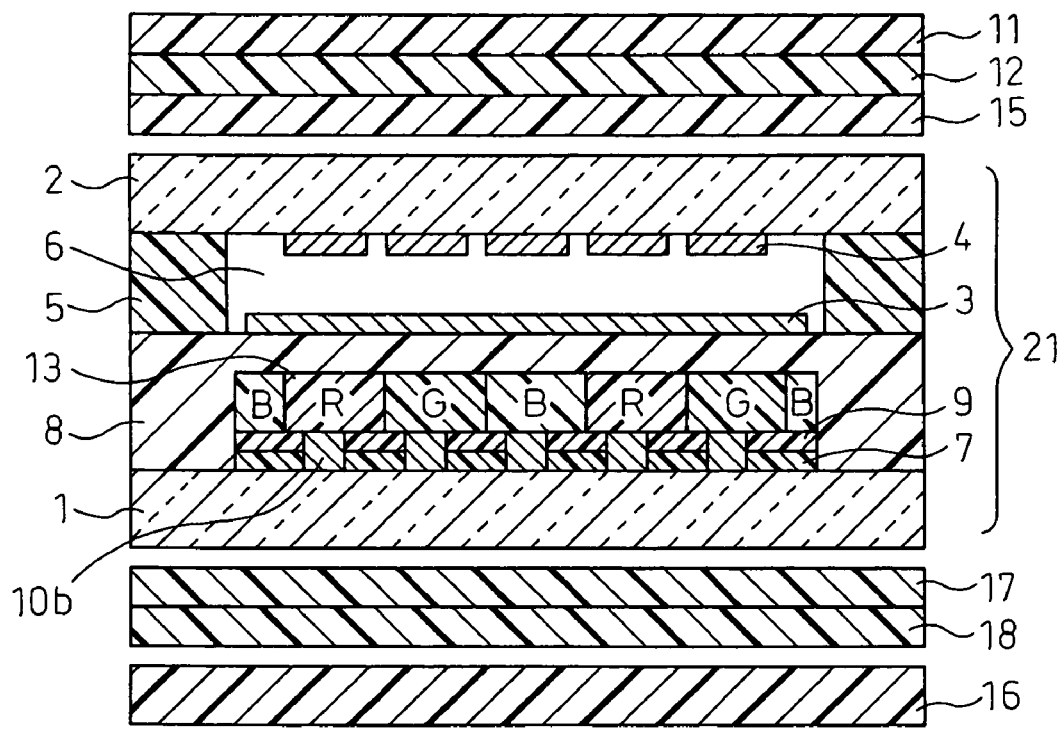
FIG. 7 is a cross-sectional view showing the structure of a transflective liquid crystal display device according to a second embodiment of the present invention.

FIG. 7 is a cross-sectional view showing the transflective liquid crystal display device according to the present embodiment.

As shown in FIG. 7, the transflective liquid crystal display device of the present embodiment comprises a liquid crystal device 21, a scattering layer 15 provided above the liquid crystal device 21, a liquid crystal polymer phase retardation plate 12, a first polarizer 11, a second polarizer 17 provided below the liquid crystal device 21, a reflective polarizer 18, and a backlight 16. The first polarizer 11, the second polarizer 17, the liquid crystal polymer phase retardation plate 12, and the backlight 16 are constructed from the same component members as those used in the first embodiment, and their relative orientations are the same as those described in the first embodiment. A multilayer film made of materials of different refractive indices, known as the tradename D-BEF (manufactured by 3M), is used as the reflective polarizer 18, and the reflective polarizer 18 is oriented so that its transmission axis coincides with the transmission axis of the second polarizer 17.

The liquid crystal device 21 comprises: a first substrate 1 made of a 0.5-mm thick glass plate on which are formed a 0.15-μm thick transflective layer 7 made of aluminum, a patterning phase retardation layer 9, a 1-μm thick color filter layer forming three color filters, i.e., red filters R, green filters G, and blue filters B, a 2-μm thick protective layer 8 made of an acrylic-based material, and 0.2-μm thick first electrodes 3 made of ITO; a second substrate 2 made of a 0.5-mm thick glass plate on which 0.2-μm thick second electrodes 4 made of ITO are formed; a seal member 5 for bonding the first and second substrates 1 and 2 together; and a liquid crystal layer 6 formed from a left-handed 240° twisted nematic liquid crystal sandwiched between the first and second substrates 1 and 2. The nematic liquid crystal used here and the Δnd value of the liquid crystal device are the same as those in the first embodiment.

The color filter layer 13 forms three color filters, the red filters R, the green filters G, and the blue filters B, and the filters are formed in vertical stripe patterns parallel to the second electrodes 4. The width of each color filter is made larger than the width of each second electrode 4 so that no gaps are formed between the filters and any two adjacent colors overlap each other.

If a gap is formed between the color filters 13, the light attenuated through the filters partially becomes unattenuated, and the amount of incident light increases correspondingly, increasing the brightness of the reflective display. However, as light not passed through the color filters is mixed into the display color, the color purity of the display degrades, resulting in a degradation of the display quality.

For the color filters 13, filters of a pigment dispersion type formed from an acrylic- or PVA-based photosensitive resin with a pigment dispersed in it have been used here. The reason is that the pigment dispersion type is most preferable for the filters because of its high heat-resisting temperature and good color purity. However, various types of filter other than the pigment dispersion type, such as the dye type, print type, transfer type, and electrodeposition type, can also be used for the color filters 13.

The transflective layer 7 made of a thin aluminum film is formed on the first substrate 1. As in the case of the transflective layer in the first embodiment shown in FIG. 2, openings 7a are first formed in the transflective layer 7 by photo etching and, then, the patterning phase retardation layer 9 is formed. The present embodiment differs from the first embodiment in that the liquid crystalline high-molecular polymer is left in the openings 7a of the transflective layer, but the patterning phase retardation layer 9 left in the openings of the transflective layer is randomly oriented, and therefore, does not have a phase retardation value.

Figure 8:
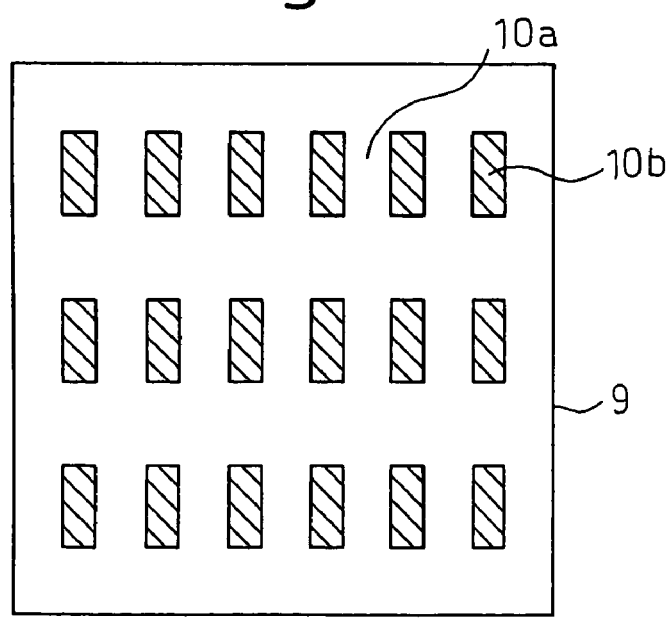
FIG. 8 is an enlarged plan view showing a patterning phase retardation layer in the transflective liquid crystal display device according to the second embodiment of the present invention.

FIG. 8 is a plan view of the patterning phase retardation layer used in the transflective liquid crystal display device of the present embodiment.

As shown in FIG. 8, the patterning phase retardation layer 9 is formed over the entire surface of the substrate, and includes portions 10a having a phase retardation effect and portions 10b that do not have a phase retardation effect. The retardation value of the patterning phase retardation layer 9 is 140 nm, and its orientation direction is the same as that in the first embodiment.

A method for fabricating the patterning phase retardation layer of the present embodiment will be described below.

First, an optical alignment layer is formed by printing or spinning over the first substrate on which the transflective layer 7 has been formed.

Then, using a photomask, only the unopened portions of the transflective layer are exposed to linearly polarized UV radiation projected at a prescribed angle.

Next, the optical alignment layer is cured by heating.

Then, a photosensitive liquid crystalline high-molecular monomer is applied over the optical alignment layer by using a spinner.

Next, the liquid crystalline high-molecular monomer is heated to a temperature of 70° C. to 90° C. higher than the isotropic temperature, and then gradually cooled to orient the liquid crystalline high-molecular monomer. At this time, in portions exposed to the linearly polarized UV, the liquid crystalline high-molecular monomer is preferentially oriented but, in unexposed portions, the liquid crystalline high-molecular monomer is randomly oriented.

Next, the entire surface is exposed to UV radiation to polymerize the liquid crystalline high-molecular monomer, completing the formation of the patterning phase retardation layer.

As shown in FIG. 8, in the patterning phase retardation layer 9 (thickness about 0.1 μm), 140-nm phase retardation portions 10a where the liquid crystalline high-molecular monomer is preferentially oriented are formed on the unopened (reflective) portions of the transflective layer 7, while portions 10b where the retardation value is nearly zero are formed on the openings of the transflective layer.

The color filters 13 are formed on the patterning phase retardation layer 9. To form the color filters 13, a color resist formed from a photosensitive resin with 10 to 15% of pigment mixed therein is applied over the patterning phase retardation layer 9 formed on the first substrate 1, and then, exposure and developing steps are performed to form the color filters 13 of each color. The color filters 13 have high transmittance, and their thickness is about 1 μm.

Next, the operating principle of the present embodiment will be described.

The basic operation for the reflective display and transmissive display is the same as that described in the first embodiment, and will not be repeated here. The liquid crystal device 21 contains the color filters 13; the color filters 13 are formed in close proximity to the transflective layer 7 so that color mixing due to parallax does not occur. Accordingly, the liquid crystal display device of the present embodiment can achieve a high saturation color reflective display.

Further, in the liquid crystal display device of the present embodiment, the reflective polarizer 18, which absorbs very little light, is provided on the outside of the second polarizer 17. Accordingly, of the light emitted from the backlight 16, the light parallel to the transmission axis of the second polarizer passes through the second polarizer, but the light parallel to the absorption axis of the second polarizer is reflected by the reflective polarizer 18 back to the backlight 16 because such light is parallel to the reflection axis of the reflective polarizer 18. As the light returned to the backlight 16 is reflected by the diffuser or prism sheet on the surface of the backlight and reused as backlighting (light recycle effect), the liquid crystal display device of the present embodiment achieves a bright transmissive display.

Further, in the liquid crystal display device of the present embodiment, since there is no quarter-wave length phase retardation plate between the transflective layer and the second polarizer, of the light emitted from the backlight is reflected by the unopened portions of the reflective layer and returns to the backlight by passing through the second polarizer, and further, the light reflected by the backlight is not absorbed by the second polarizer 17 because of the provision of the reflective polarizer 18; in this way, light utilization efficiency is enhanced by the light recycle effect, and a brighter transmissive display can thus be achieved.

In the liquid crystal display device of the present embodiment, unlike the first embodiment, the openings 7a of the transflective layer are filled with those portions of the patterning phase retardation layer that do not have a phase retardation function; this serves to improve surface planarity, achieving the effect of reducing display unevenness and improving the contrast of the display.

Next, the effect of the second embodiment will be described.

The second embodiment, like the first embodiment, can achieve a high-contrast bright transmissive display because of the provision of the liquid crystal polymer phase retardation plate 12 and the patterning phase retardation layer 9.

Further, in the second embodiment, the reuse efficiency of the light reflected by the transflective layer 7 and returned to the backlight increases because of the provision of the reflective polarizer 18. Accordingly, coupled with the light reuse effect of the earlier described conventional reflective polarizer, the second embodiment can achieve a display more than 1.5 times (for example, approximately twice) as bright as that achieved in the prior art.

In this way, in the transflective liquid crystal display device of the second embodiment, which comprises the first polarizer 11, the liquid crystal polymer phase retardation plate 12, the reflective layer 7, the patterning phase retardation layer 9, the liquid crystal device 21 containing the color filters 13, the second polarizer 17, and the reflective polarizer 18, a good contrast color display can be produced in the reflective display mode that uses ambient light. Further, the transflective liquid crystal display device of the second embodiment can achieve a high-contrast bright color transmissive display even in low ambient light conditions by activating the backlight 16. Furthermore, since the transflective liquid crystal display device of the second embodiment is a normally black display, the display can be driven at low voltage, as previously described.

In the present embodiment, the color filters 13 have been formed on the first substrate 1, but instead, the color filters may be formed on the liquid crystal side of the second substrate 2, or more specifically, between the second substrate 2 and the second electrodes 4. However, providing the color filters on the first substrate has the effect that the color filters are planarized by the protective layer 8, and also that the protective layer 8 can be used as an insulating layer between the transflective layer 7 and the first electrodes 3.

Further, in the present embodiment, three color filters of red, green, and blue have been used as the color filters 13, but if three color filters of cyan, yellow, and magenta are used, a bright color display can likewise be achieved. If high saturation color filters are used though the transmittance somewhat drops, and if the portions of the color filters that correspond to the unopened portions of the transflective layer are partially removed to form portions where no color filters are formed within the pixels, then a high saturation transmissive display and a bright reflective display can be achieved simultaneously.

A transflective liquid crystal display device according to a third embodiment of the present invention will be described below. The liquid crystal display device of this embodiment differs from the structure of the first embodiment in that the patterning phase retardation layer is provided on the second substrate.

Figure 9:
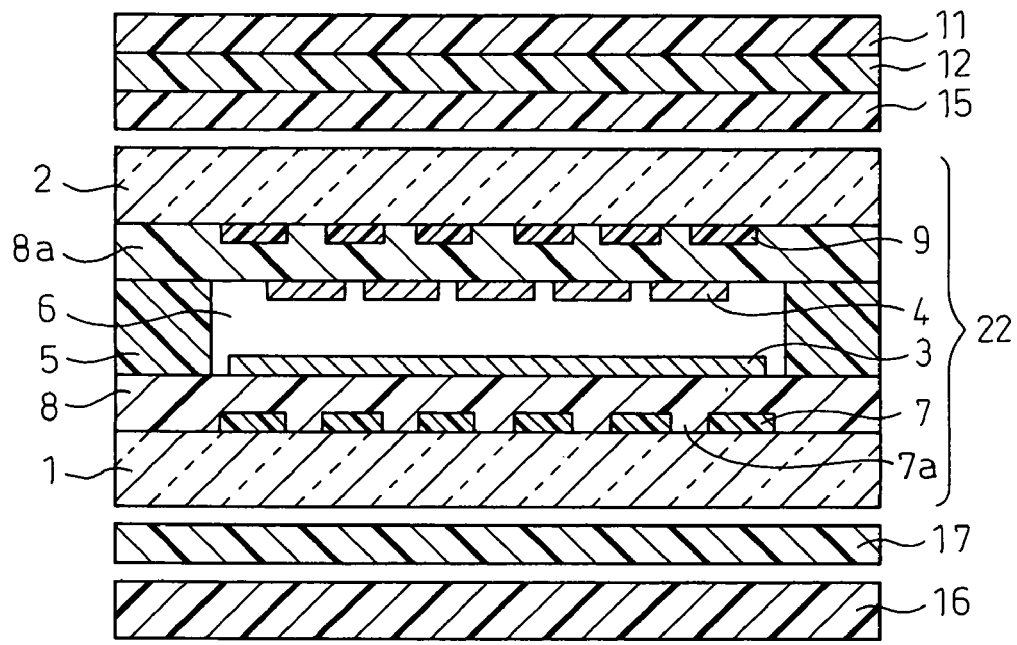
FIG. 9 is a cross-sectional view showing the structure of a transflective liquid crystal display device according to a third embodiment of the present invention.

FIG. 9 is a cross-sectional view for explaining the component elements of the liquid crystal display device according to the present embodiment.

As shown in FIG. 9, the transflective liquid crystal display device of the present embodiment comprises a liquid crystal device 22, a scattering layer 15 provided above the liquid crystal device 22, a liquid crystal polymer phase retardation plate 12, a first polarizer 11, a second polarizer 17 provided below the liquid crystal device 22, and a backlight 16. The first polarizer 11, the second polarizer 17, the liquid crystal polymer phase retardation plate 12, and the backlight 16 are constructed from the same component members as those used in the first embodiment.

The liquid crystal device 22 comprises: a first substrate 1 made of a 0.5-mm thick glass plate on which are formed a 0.15-μm thick transflective layer 7 made of aluminum, a 2-μm thick protective layer 8 made of an acrylic-based material, and 0.2-μm thick first electrodes 3 made of ITO; a second substrate 2 made of a 0.5-mm thick glass plate on which are formed a patterning phase retardation layer 9, a 2-μm thick protective layer 8a, and 0.2-μm thick second electrodes 4 made of ITO; a seal member 5 for bonding the first and second substrates 1 and 2 together; and a liquid crystal layer 6 formed from a left-handed 240° twisted nematic liquid crystal sandwiched between the first and second substrates 1 and 2. The nematic liquid crystal used here and the Δnd value of the liquid crystal device are the same as those in the first embodiment.

The method for fabricating the patterning phase retardation layer 9 is the same as that described in the first embodiment, and will not be repeated here. The retardation value is approximately equal to quarter wavelength, as in the first embodiment.

Figure 10:
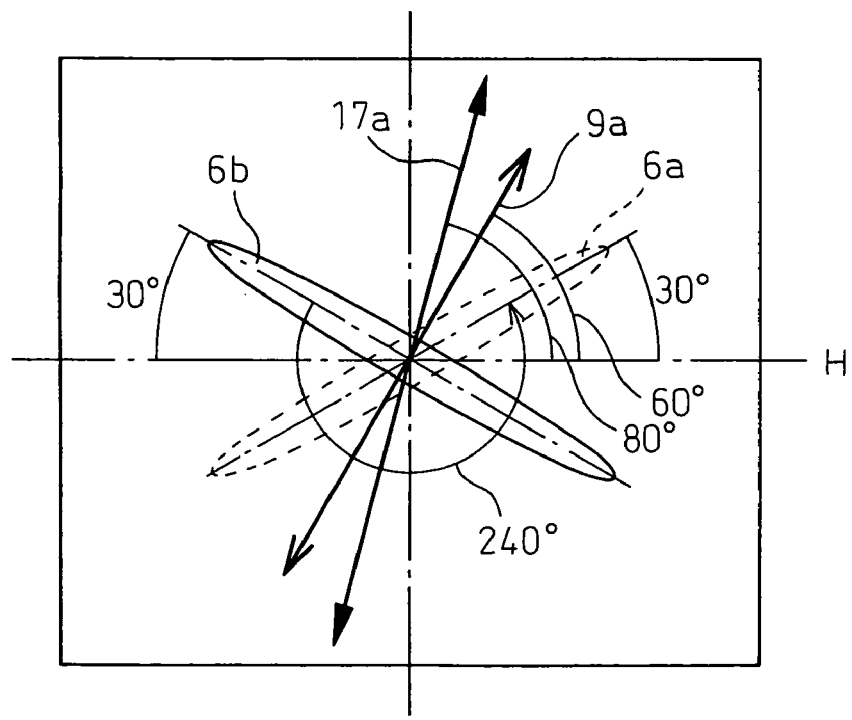
FIG. 10 is a drawing showing how component elements are oriented relative to each other in the transflective liquid crystal display device according to the third embodiment of the present invention.
Figure 11:
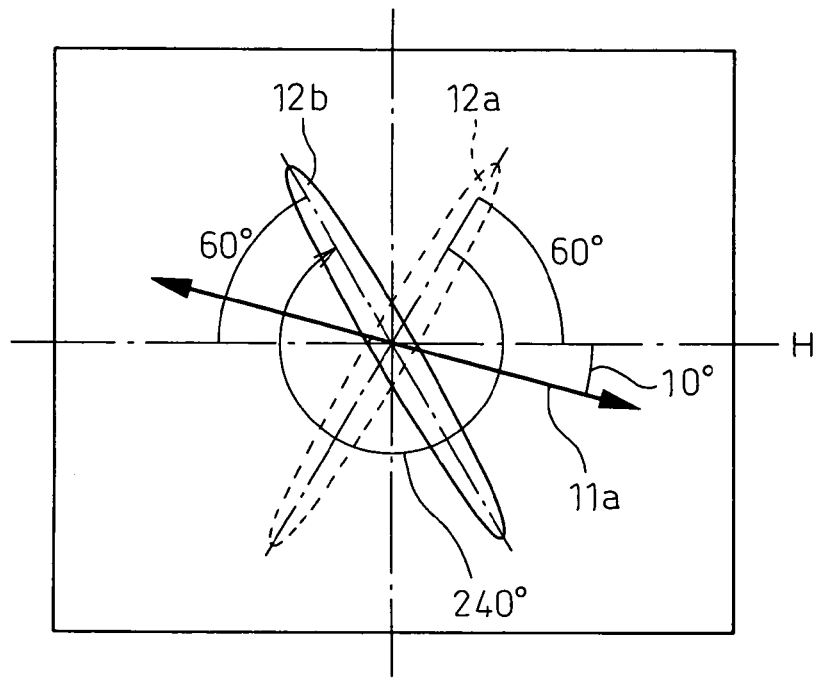
FIG. 11 is a drawing showing how component elements are oriented relative to each other in the transflective liquid crystal display device according to the third embodiment of the present invention.

FIG. 10 is a diagram showing the relative orientations of the liquid crystal device 22 and the component members provided below the liquid crystal device 22. FIG. 11 is a diagram showing the relative orientations of the component members provided above the liquid crystal device 22.

An alignment layer (not shown) is formed on the surface of each of the first and second electrode layers 3 and 4. As shown in FIG. 10, the rubbing direction of the liquid crystal device 22 is the same as that shown in the first embodiment. Further, as shown in FIG. 11, the relative orientation of the liquid crystal polymer phase retardation plate 12 is the same as that shown in the first embodiment.

As shown in FIG. 11, the transmission axis 11a of the first polarizer is oriented at −10° relative to the horizontal axis H. The transmission axis 17a of the second polarizer 17 is oriented at +80° relative to the horizontal axis H, as shown in FIG. 10, that is, at right angles to the transmission axis 11a of the first polarizer 11. As shown in FIG. 10, the patterning phase retardation layer is formed so that its phase retardation axis 9a is oriented at +60° relative to the horizontal axis H.

The operating principle of the present embodiment will be described below.

The transmissive mode operation of the liquid crystal display device of the present embodiment is the same as that of the first embodiment. First, when no voltage is applied to the liquid crystal layer (OFF state), the light emitted from the backlight 16 passes through the second polarizer 17 to form linearly polarized light which passes through the openings 7a of the transflective layer 7. Here, the openings of the patterning phase retardation layer 9 do not have a phase retardation value. The combined birefringence of the liquid crystal layer 6 and the liquid crystal polymer phase retardation plate 12 is zero. As a result, the light passed through the openings 7a of the transflective layer 7 arrives unchanged at the first polarizer 11. Here, as the first polarizer 11 is oriented at right angles to the transmission axis of the second polarizer 17, the light passed through the openings 7a of the transflective layer 7 is absorbed by the first polarizer 11. Accordingly, the liquid crystal display appears black.

When a voltage is applied to the liquid crystal layer (ON state), the liquid crystal molecules stand up and the birefringence of the liquid crystal layer decreases, so that the combined birefringence of the liquid crystal polymer phase retardation plate 12 and the liquid crystal layer does not become zero. Accordingly, the linearly polarized light passed through the second polarizer 17 arrives as elliptically polarized light at the first polarizer 11. As some of the light arriving at the first polarizer 11 passes through the first polarizer, the liquid crystal display appears white. Further, unlike the liquid crystal display device shown in FIG. 15, in the liquid crystal display device of the present embodiment, there is no quarter-wave length phase retardation plate between the second polarizer 17 and the liquid crystal device 22; therefore, the light reflected by the transflective layer 7 is directed back to the backlight and reused for backlighting, thus achieving a brighter transmissive display.

Next, the reflective display mode of the liquid crystal display device of the present embodiment will be described. Unlike the first embodiment, in the liquid crystal display device of the present embodiment, the patterning phase retardation layer 9 is provided between the liquid crystal polymer phase retardation plate 12 and the liquid crystal layer 6; as a result, the combined birefringence of the patterning phase retardation layer 9 and the liquid crystal layer 6 cannot be completely compensated for by the liquid crystal polymer phase retardation plate 12. However, when a trial product was built and evaluated, it was found that the effect of the patterning phase retardation layer reduces to a minimum when the retardation axis 9a of the patterning phase retardation layer 9 is oriented in the same direction as the lower molecular alignment direction 12a of the liquid crystal polymer phase retardation plate. Accordingly, in the present embodiment, as the retardation axis 9a of the patterning phase retardation layer 9 is oriented in the same direction as the lower molecular alignment direction 12a of the liquid crystal polymer phase retardation plate, a black display state can be achieved though the contrast drops compared with the first embodiment.

When a voltage is applied (ON state), the liquid crystal molecules stand up, and the birefringence of the liquid crystal layer 6 decreases by an amount approximately equal to quarter wavelength; as a result, the combined birefringence of the liquid crystal polymer phase retardation plate 12, the liquid crystal layer 6, and the patterning phase retardation layer 9 becomes nearly zero. Accordingly, in this case, the liquid crystal display device of the present embodiment produces a white display state.

Further, in the liquid crystal display device of the present embodiment, as the patterning phase retardation layer 9 is formed on the second substrate, the structure of the first substrate is simplified, and the fabrication yield improves. This is because, when color filters are formed on the first substrate, i.e., the bottom substrate, the patterning phase retardation layer must be formed in addition to the color filters as shown in FIG. 7, and the structure of the first substrate becomes complex.

In this way, according to the liquid crystal display device of the present embodiment comprising the first polarizer 11, the liquid crystal polymer phase retardation plate 12, the liquid crystal device 22 containing the patterning phase retardation layer 9 and the transflective layer 7, and the second polarizer 17, a high-contrast bright transmissive display can be achieved. Further, according to the liquid crystal display device of the present embodiment, a reflective display can also be achieved utilizing the internal reflector structure. Furthermore, since the liquid crystal display device of the present embodiment is a normally black display, the display can be driven at low voltage.

A transflective liquid crystal display device according to a fourth embodiment of the present invention will be described below.

The liquid crystal display device of this embodiment differs from the structure of the first embodiment in that the liquid crystal device and the liquid crystal polymer phase retardation plate both have homogenous alignment.

Figure 12:
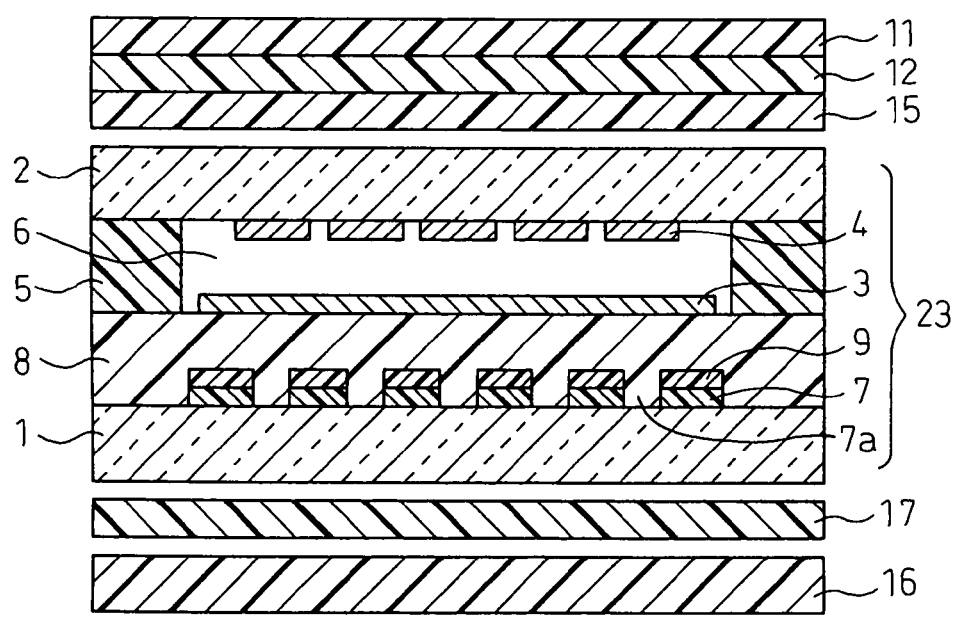
FIG. 12 is a cross-sectional view showing the structure of a transflective liquid crystal display device according to a fourth embodiment of the present invention.

FIG. 12 is a cross-sectional view for explaining the component elements of the liquid crystal display device according to the present embodiment.

As shown in FIG. 12, the transflective liquid crystal display device of the present embodiment comprises a liquid crystal device 23, a scattering layer 15 provided above the liquid crystal device 23, a liquid crystal polymer phase retardation plate 12, a first polarizer 11, a second polarizer 17 provided below the liquid crystal device 23, and a backlight 16. The first polarizer 11, the second polarizer 17, the scattering layer 15, and the backlight 16 are constructed from the same component members as those used in the first embodiment.

The liquid crystal device 23 comprises: a first substrate 1 made of a 0.5-mm thick glass plate on which are formed a 0.15-m thick transflective layer 7 made of aluminum, a patterning phase retardation layer 9, a 2-µm thick protective layer 8 made of an acrylic-based material, and 0.2-µm thick first electrodes 3 made of ITO; a second substrate 2 made of a 0.5-mm thick glass plate on which 0.2-µm thick second electrodes 4 made of ITO are formed; a seal member 5 for bonding the first and second substrates 1 and 2 together; and a liquid crystal layer 6 formed from a nematic liquid crystal of homogeneous orientation (twist angle of 0°) sandwiched between the first and second substrates 1 and 2. The Δn value of the nematic liquid crystal used is 0.1, and the cell gap d between the first substrate 1 and the second substrate 2 is 2; therefore, the Δnd value of the liquid crystal device 23, i.e., the birefringence Rs of the liquid crystal device, is 0.2 µm.

Figure 13:
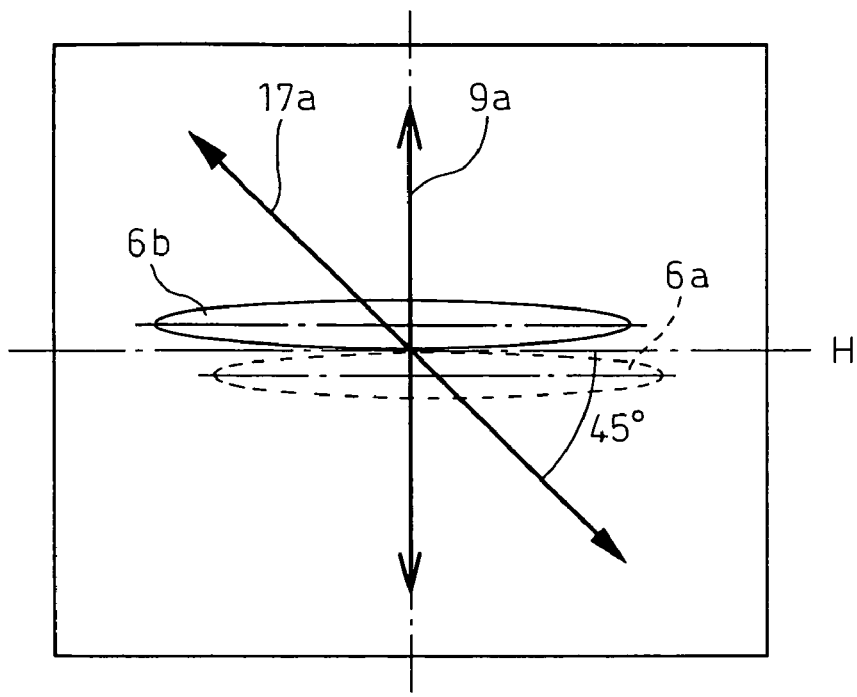
FIG. 13 is a drawing showing how component elements are oriented relative to each other in the transflective liquid crystal display device according to the fourth embodiment of the present invention.
Figure 14:
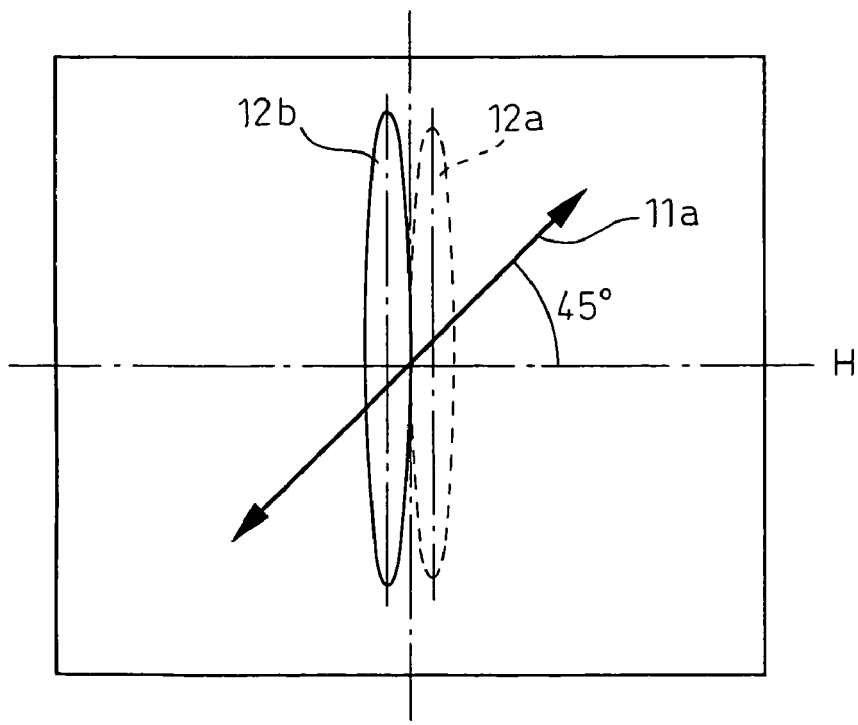
FIG. 14 is a drawing showing how component elements are oriented relative to each other in the transflective liquid crystal display device according to the fourth embodiment of the present invention.

FIG. 13 is a diagram showing the relative orientations of the liquid crystal device 23 and the component members provided below the liquid crystal device 23. FIG. 14 is a diagram showing the relative orientations of the component members provided above the liquid crystal device 23.

The patterning phase retardation layer 9 is fabricated by the same fabrication method as the first embodiment. The retardation value of the patterning phase retardation layer 9 is 140 nm. As shown in FIG. 13, the retardation axis 9a of the patterning phase retardation layer 9 is oriented at +90° relative to the horizontal axis H.

The liquid crystal polymer phase retardation plate 12 is fabricated by a similar fabrication method to that of the first embodiment, but is formed here as a liquid crystal polymer phase retardation plate of a homogenous alignment by not adding a chiral material to provide a twist to the liquid crystalline high-molecular monomer.

As shown in FIG. 14, the transmission axis 11a of the first polarizer is oriented at +45° relative to the horizontal axis H. The liquid crystal polymer phase retardation plate 12 also has homogeneous orientation, and the lower molecular alignment direction 12a and the upper molecular alignment direction 12b are both oriented at +90° relative to the horizontal axis H, i.e., at right angles to the alignment direction of the liquid crystal device 23. The Δnd value of the liquid crystal polymer phase retardation plate 12, i.e., the birefringence Rc of the liquid crystal polymer phase retardation plate, is 0.2. Accordingly, the birefringence difference ΔR (=Rs=Rc) between the liquid crystal device 23 and the liquid crystal polymer phase retardation plate 12 is zero. With the above arrangement, the birefringence occurring in the liquid crystal device can be completely compensated for by the liquid crystal polymer phase retardation plate.

As shown in FIG. 13, the transmission axis 17a of the second polarizer 17 provided below the liquid crystal device 23 is oriented at −45° relative to the horizontal axis H, that is, at right angles to the transmission axis 11a of the first polarizer 11. As shown in FIG. 13, the patterning phase retardation layer is formed so that its phase retardation axis 9a is oriented at +90° relative to the horizontal axis H. Therefore, the orientation angle between the first phase retardation plate and the transmission axis 11a is 45°, the angle where a phase difference occurs most easily.

The operating principle of the present embodiment will be described below.

The transmissive mode operation of the liquid crystal display device of the present embodiment is the same as that described in the first embodiment. That is, the light emitted from the backlight 16 passes through the second polarizer 17 to form linearly polarized light which passes through the openings 7a of the transflective layer 7 shown in FIG. 12. In the OFF state, as the openings of the patterning phase retardation layer 9 do not have a phase retardation value, and as the combined birefringence of the liquid crystal layer 6 and the liquid crystal polymer phase retardation plate 12 is zero, the light passed through the openings 7a of the transflective layer 7 arrives unchanged at the first polarizer 11. Here, as the first polarizer 11 is oriented at right angles to the transmission axis of the second polarizer 17, the light passed through the openings 7a of the transflective layer 7 (the light emitted from the backlight 16) is absorbed by the first polarizer 11. Accordingly, in this case, the liquid crystal display of the present embodiment appears black. Here, as the wavelength dependence of the refractive index of the liquid crystal polymer phase retardation plate 12 is close to that of the liquid crystal layer 6, the birefringence occurring in the liquid crystal layer 6 can be compensated for by the liquid crystal polymer phase retardation plate 12 over the entire wavelength range, and a good black display can thus be achieved.

When a voltage is applied to the liquid crystal layer (ON state), the liquid crystal molecules stand up and the birefringence of the liquid crystal layer decreases, so that the combined birefringence of the liquid crystal polymer phase retardation plate 12 and the liquid crystal layer does not become zero. Accordingly, the linearly polarized light passed through the second polarizer 17 arrives as elliptically polarized light at the first polarizer 11. As some of the light arriving at the first polarizer 11 passes through the first polarizer, the liquid crystal display of the present embodiment appears white. Further, in the liquid crystal display device of the present embodiment, there is no quarter-wave length phase retardation plate between the second polarizer 17 and the liquid crystal device 23; therefore, the light reflected by the transflective layer 7 is directed back to the backlight and reused for backlighting, thus achieving a brighter display.

Next, the reflective display mode of the liquid crystal display device of the present embodiment will be described. As in the first embodiment, the liquid crystal polymer phase retardation plate 12 is chosen to have a phase retardation value approximately equal to that of the liquid crystal layer 6 so as to completely compensate for the birefringence occurring in the liquid crystal layer 6, and the liquid crystal layer and the liquid crystal polymer phase retardation plate are arranged with the alignment directions in their facing surfaces oriented at right angles to each other so that the retardation value of one is subtracted from the retardation value of the other. In the OFF state, ambient light entering the first polarizer 11 is converted into linearly polarized light, and the linearly polarized light passes unchanged through the liquid crystal layer 6. The light passed through the liquid crystal layer 6 is converted, by passing through the patterning phase retardation layer 9, into circularly polarized light whose phase is then 180° reversed on reflection by the transflective layer 7, the light thus being converted into circularly polarized light rotating in the opposite sense. The light reflected by the transflective layer 7 once again passes through the patterning phase retardation layer 9, and arrives at the first polarizer 11 as linearly polarized light with its direction of polarization rotated 90° relative to the incident light. As the light arriving at the first polarizer is absorbed by the first polarizer 11, the liquid crystal display appears black.

When a voltage is applied (ON state), the liquid crystal molecules stand up, and the birefringence of the liquid crystal layer 6 decreases by an amount approximately equal to quarter wavelength; as a result, the combined birefringence value of the liquid crystal polymer phase retardation plate 12, the liquid crystal layer 6, and the patterning phase retardation layer 9 becomes nearly zero. Accordingly, the linearly polarized light passed through the first polarizer 11 arrives at the transflective layer 7 without changing its linear polarization state. The light arriving at the transflective layer 7 once again passes unchanged through the patterning phase retardation layer 9, the liquid crystal layer 6, and the liquid crystal polymer phase retardation plate 12, and the light remaining linearly polarized in the same direction as the incident light arrives at the first polarizer 11. As the light arriving at the first polarizer 11 passes through the first polarizer 11, the liquid crystal display appears white.

In this way, according to the transflective liquid crystal display device of the present embodiment comprising the first polarizer 11, the liquid crystal polymer phase retardation plate 12, the liquid crystal device 23 containing the patterning phase retardation layer 9 and the transflective layer 7, and the second polarizer 17, a high-contrast bright transmissive display can be achieved even when the liquid crystal device has homogeneous orientation. Further, according to the transflective liquid crystal display device of the present embodiment, a reflective display can also be achieved utilizing the internal reflector structure. Furthermore, as the transflective liquid crystal display device of the present embodiment is a normally black display, the display can be driven at low voltage.

Figure 17:
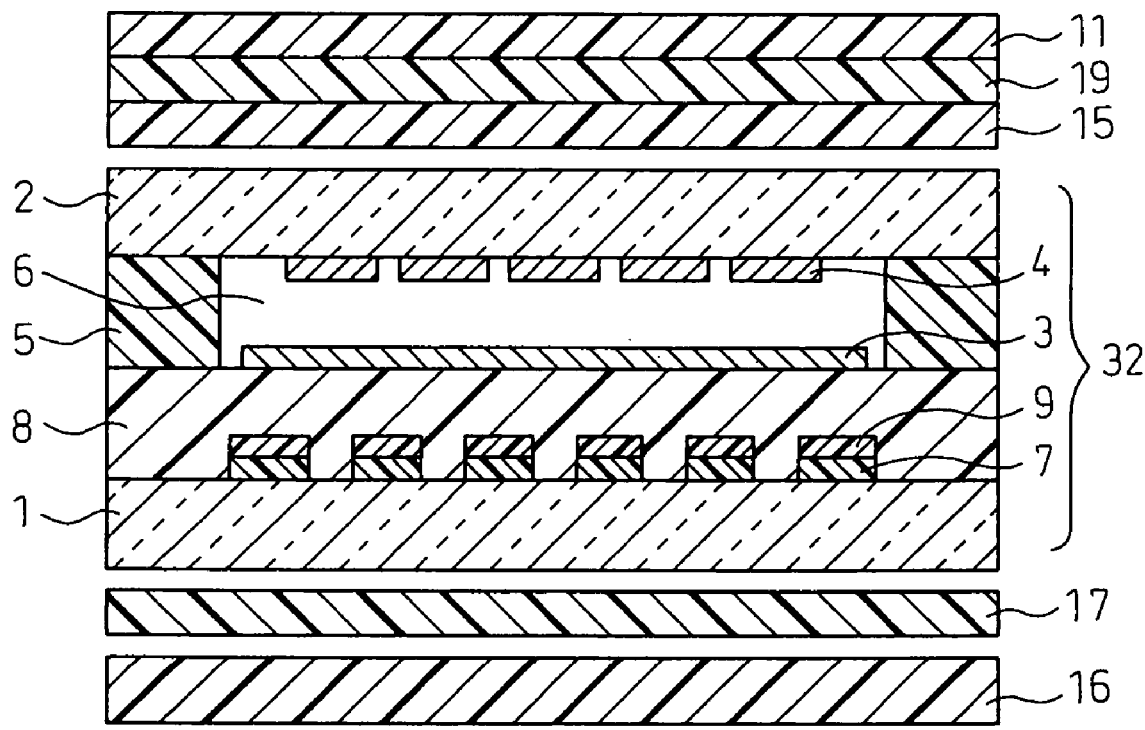
FIG. 17 is a cross-sectional view showing the structure of a transflective liquid crystal display device provided with a patterning phase retardation layer.

The liquid crystal polymer phase retardation plate 12 used in the present embodiment is not twisted, and exhibits performance similar to that of a phase retarder. However, the wavelength dependence of the refractive index of the liquid crystal polymer phase retardation plate 12 used in the present embodiment is close to that of the liquid crystal device, and the liquid crystal polymer phase retardation plate 12 used in the present embodiment can completely compensate for the phase retardation of the liquid crystal device to improve the transmissive contrast. Accordingly, the liquid crystal polymer phase retardation plate 12 used in the present embodiment differs in phase retardation value and in orientation angle, as well as in operation and effect, from the half-wave length phase retardation plate used in the liquid crystal display device shown in FIG. 17 in which the liquid crystal device and the broadband phase retardation plate are formed to improve the reflective contrast.

Further, in the present embodiment, the patterning phase retardation layer 9 has been provided between the transflective layer 7 and the liquid crystal layer 6, but instead, it may be provided between the liquid crystal layer 6 and the second substrate 2, as in the third embodiment. In that case also, the retardation axis 9a of the patterning phase retardation layer should be oriented in the same direction as the lower molecular alignment direction 12a of the liquid crystal polymer phase retardation plate, as in the present embodiment, and the relative orientations of the polarizers and the patterning phase retardation layer should be made the same as those described in the present embodiment.

As is apparent from the above description, according to the present invention, by using the first polarizer, the liquid crystal polymer phase retardation plate, and the patterning phase retardation layer, it becomes possible to provide a liquid crystal display device, in particular, a transflective liquid crystal display device of an internal reflector type, that greatly improves the contrast of a transmissive display and can obtain high contrast even in the case of low voltage driving, and that can achieve a bright transmissive display due to the recycle effect.

What is claimed is:

1. A liquid crystal display device comprising:
 a first polarizer;
 a second polarizer;
 a liquid crystal cell having a liquid crystal layer provided between a first substrate and a second substrate;
 a transflective layer provided within said liquid crystal cell, and having openings;
 a patterning phase retardation layer provided within said liquid crystal cell, and having retardation in portions other than the portions where said openings of said transflective layer are formed; and
 an optical element for compensating for an optical property of said liquid crystal layer, said optical element being provided between said first polarizer and said liquid crystal cell and nearer to said first polarizer than to said transflective layer.

2. The liquid crystal display device according to claim 1, wherein $\Delta nd$ that represents birefringence of said optical element is approximately equal to $\Delta nd$ given by the product of birefringence $\Delta n$ of said liquid crystal layer and cell gap $d$ of said liquid crystal layer.

3. The liquid crystal display device according to claim 2, wherein said optical element is oriented at such an angle as to compensate for the optical property of said liquid crystal layer.

4. The liquid crystal display device according to claim 1, wherein said optical element is a liquid crystal polymer phase retardation plate.

5. The liquid crystal display device according to claim 4, wherein said liquid crystal layer is formed from a twisted nematic liquid crystal, and wherein
 said liquid crystal polymer phase retardation plate has a twisted orientation whose twist handedness is opposite to the twist handedness of said liquid crystal layer, and whose twist angle is approximately equal in absolute value to the twist angle of said liquid crystal layer, and
 said patterning phase retardation layer is located between said transflective layer and said liquid crystal layer, and has retardation value approximately equal to a quarter wavelength.

6. The liquid crystal display device according to claim 4, wherein said liquid crystal layer is formed from a twisted nematic liquid crystal, and wherein
 said liquid crystal polymer phase retardation plate has a twisted orientation whose twist handedness is opposite to the twist handedness of said liquid crystal layer, and whose twist angle is approximately equal in absolute value to the twist angle of said liquid crystal layer, and
 said patterning phase retardation layer is located between said liquid crystal layer and said second substrate, and has retardation value approximately equal to a quarter wavelength.

7. The liquid crystal display device according to claim 4, wherein said liquid crystal layer is formed from a nematic liquid crystal of homogeneous orientation, and wherein said liquid crystal polymer phase retardation plate has homogeneous orientation, and is oriented at right angles to said liquid crystal layer, and said patterning phase retardation layer is located between said transflective layer and said liquid crystal layer, and has retardation value approximately equal to a quarter wavelength.

8. The liquid crystal display device according to claim 4, wherein said liquid crystal layer is formed from a nematic liquid crystal of homogeneous orientation, and wherein said liquid crystal polymer phase retardation plate has homogeneous orientation, and is oriented at right angles to said liquid crystal layer, and said patterning phase retardation layer is located between said liquid crystal layer and said second substrate, and has retardation value approximately equal to a quarter wavelength.

9. The liquid crystal display device according to claim 1, further comprising a scattering layer on an outside of said second substrate.

10. The liquid crystal display device according to claim 1, further comprising color filters of a plurality of colors provided on either said first substrate or said second substrate.

11. The liquid crystal display device according to claim 4, wherein the patterning phase retardation layer has substantially the same thickness in said openings of said transflective layer.

12. The liquid crystal display device according to claim 1, further comprising a reflective polarizer on an outside of said second polarizer, said reflective polarizer having a transmission axis oriented substantially parallel to the transmission axis of said second polarizer.

13. A liquid crystal display device comprising:

a first polarizer;

a liquid crystal cell with a liquid crystal provided between a first substrate and a second substrate; and a second polarizer, wherein said liquid crystal element includes a transflective layer which has openings and a patterning phase retardation layer which has retardation in unopened portions where said openings of said transflective layer are not formed, and said liquid crystal display device further comprises a liquid crystal polymer phase retardation plate provided between said first polarizer and said liquid crystal cell and nearer to said first polarizer than said transflective layer, wherein Δnd, that represents birefringence of said liquid crystal polymer phase retardation plate, is approximately equal to Δnd of said liquid crystal cell, and said liquid crystal polymer phase retardation plate is oriented so as to compensate for the birefringence occurring in said liquid crystal cell.

* * * * *